US012762157B2

(12) United States Patent
Ryan et al.

(10) Patent No.: US 12,762,157 B2
(45) Date of Patent: *Oct. 13, 2026

(54) APPARATUS AND METHOD FOR GENERATING AN ARTICLE

(71) Applicant: Lede AI LLC, Mansfield, OH (US)

(72) Inventors: Evan Ryan, Lucas, OH (US); Jay Allred, Mansfield, OH (US)

(73) Assignee: Lede AI LLC, Mansfield, OH (US)

( * ) Notice: Subject to any disclaimer, the term of this patent is extended or adjusted under 35 U.S.C. 154(b) by 24 days.

This patent is subject to a terminal disclaimer.

(21) Appl. No.: 19/089,264

(22) Filed: Mar. 25, 2025

(65) Prior Publication Data

US 2025/0225152 A1 Jul. 10, 2025

Related U.S. Application Data

(63) Continuation-in-part of application No. 18/368,720, filed on Sep. 15, 2023, now Pat. No. 12,293,149, which is a continuation-in-part of application No. 18/127,258, filed on Mar. 28, 2023, now Pat. No. 11,868,313.

(51) Int. Cl.
*G06F 16/28* (2019.01)
*G06F 40/20* (2020.01)

(52) U.S. Cl.
CPC ........... *G06F 16/285* (2019.01); *G06F 40/20* (2020.01)

(58) Field of Classification Search
CPC ............................... G06F 16/285; G06F 40/20
See application file for complete search history.

(56) References Cited

U.S. PATENT DOCUMENTS

| | | | | |
|---|---|---|---|---|
| 11,232,383 | B1 | 1/2022 | Burns, Sr. et al. | |
| 2007/0055596 | A1* | 3/2007 | Yankovich ............. | G06Q 40/00 705/35 |
| 2019/0014315 | A1 | 1/2019 | Karczewicz et al. | |
| 2020/0387553 | A1 | 12/2020 | Tyulyaev et al. | |
| 2021/0042324 | A1* | 2/2021 | Saeki ...................... | G06F 16/27 |
| 2021/0142432 | A1 | 5/2021 | Reynolds et al. | |
| 2021/0224490 | A1 | 7/2021 | Guo et al. | |
| 2022/0292524 | A1* | 9/2022 | Sarkar .................... | G06Q 40/03 |
| 2023/0121711 | A1 | 4/2023 | Chhaya et al. | |
| 2023/0419710 | A1 | 12/2023 | Goyal et al. | |
| 2024/0289360 | A1* | 8/2024 | Chepkwony ........ | G06F 16/3328 |

* cited by examiner

*Primary Examiner* — Loc Tran
(74) *Attorney, Agent, or Firm* — Caldwell LLC

(57) ABSTRACT

An apparatus and method for generating a report, the apparatus including at least a processor and a memory communicatively connected to the at least a processor, wherein the memory contains instructions configuring the at least a processor to generate reports from structured data using large language models.

16 Claims, 11 Drawing Sheets

APPARATUS AND METHOD FOR GENERATING AN ARTICLE

CROSS-REFERENCE TO RELATED APPLICATIONS

This application is a continuation-in-part of the Non-provisional application Ser. No. 18/368,720, filed on Sep. 15, 2023, and entitled "APPARATUS AND METHOD FOR GENERATING AN ARTICLE," which is a continuation-in-part of Non-provisional application Ser. No. 18/127,258, filed on Mar. 28, 2023, now U.S. Pat. No. 11,868,313, issued on Jan. 9, 2024, and entitled "APPARATUS AND METHOD FOR GENERATING AN ARTICLE," the entirety of both of which is incorporated herein by reference.

FIELD OF THE INVENTION

The present invention generally relates to the field of literary works. In particular, the present invention is directed to an apparatus and method for generating an activity report.

BACKGROUND

Articles are time-consuming and sometimes difficult for journalists to write. Current methods of generating reports are insufficient. There is a need for optimized generation of reports using a computing device in a manner that preserves factual accuracy.

SUMMARY OF THE DISCLOSURE

In an aspect, an apparatus for generating a report is described. The apparatus including at least a processor and a memory communicatively connected to the at least a processor, wherein the memory contains instructions configuring the at least a processor to receive a plurality of structured data comprising at least an event and whether the events are positive or negative from a structured data source, determine an activity classification as a function of the plurality of structured data, wherein the activity classification comprises an activity identifier, generate a structured data report as a function of the activity identifier, and generate a final report using a large language model (LLM), wherein the LLM is configured to receive as input the structured data report and output the final report, wherein generating the final report comprises generating a report link, wherein generating the report link comprises identifying a previous report as a function of a report tag, generating the report link as a function of the previous report, and inserting the report link into the final report.

In another aspect, a method for generating a final report is described. The method includes receiving, using at least a processor, a plurality of structured data comprising at least an event and whether the events are positive or negative from a structured data source, determining, using the at least a processor, an activity classification as a function of the plurality of structured data, wherein the activity classification comprises an activity identifier, generating, using the at least a processor, a structured data report as a function of the activity identifier, and generating, using the at least a processor, a final report using a large language model (LLM), wherein the LLM is configured to receive as input the structured data report and output the final report, wherein generating the final report comprises generating a report link, wherein generating the report link comprises identifying a previous report as a function of a report tag, generating the report link as a function of the previous report, and inserting the report link into the final report.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for generating an article. In an embodiment, an article may include a literary work containing different writing styles and formats.

Aspects of the present disclosure can be used to optimize classification of data to generate an article. Aspects of the present disclosure can also be used to augment articles to incorporate a tailored writing style. Aspects of the present disclosure can also be used to aggregate a plurality of articles into a new article.

Exemplary embodiments illustrating aspects of the present disclosure are described below in the context of several specific examples.

Figure 1:
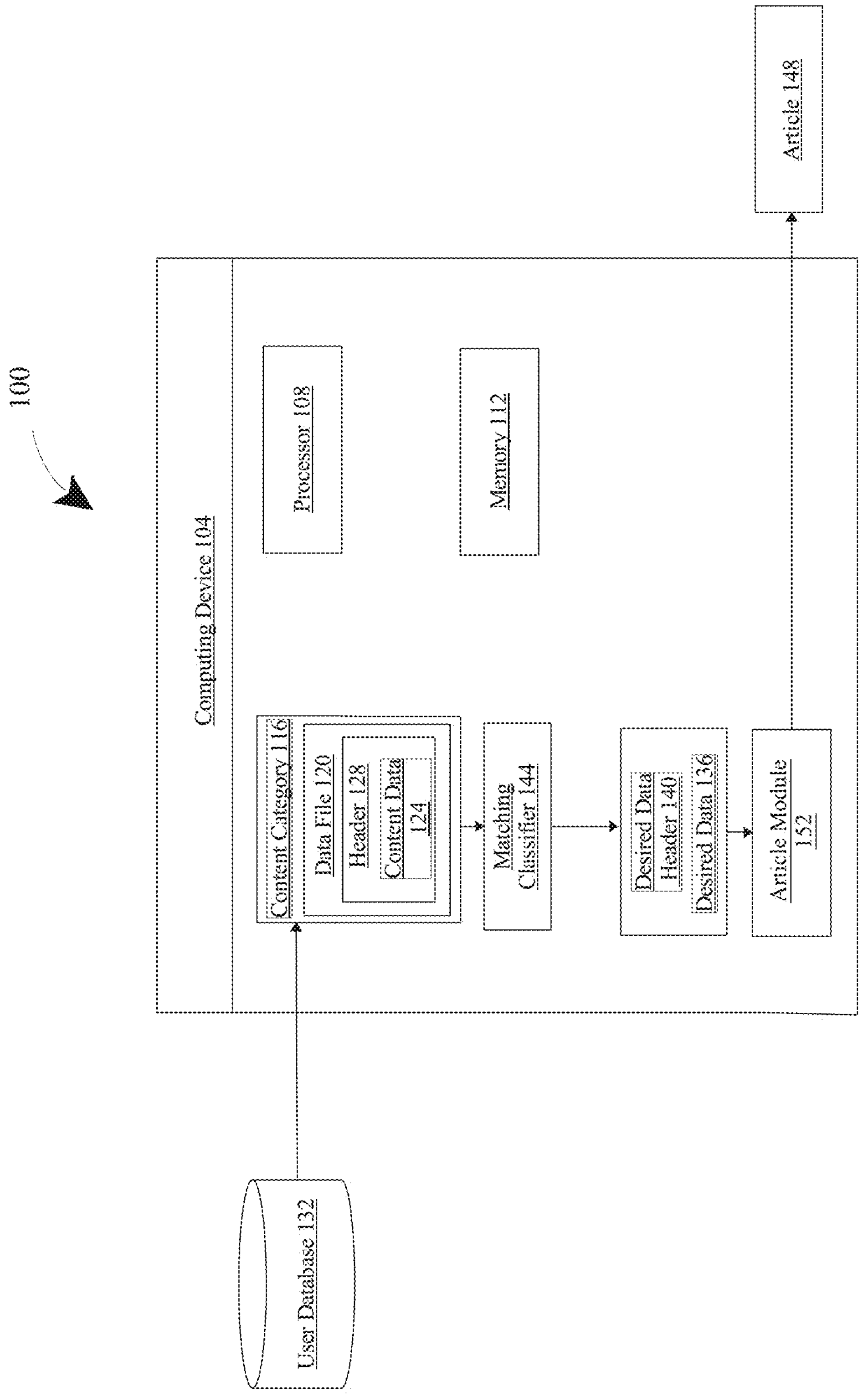
FIG. 1 is a block diagram of an exemplary embodiment of an apparatus for generating an article.

Referring now to FIG. 1, an exemplary embodiment of apparatus 100 for system improvement data is illustrated. Apparatus 100 includes a computing device 104. Computing device 104 includes a processor 108 and a memory 112 communicatively connected to the processor 108, wherein memory 112 contains instructions configuring processor 108 to conduct the generating process. Processor 108 and memory 112 are contained in computing device 104. Computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, computing device 104 is configured to receive a content category 116. A "content category," as used herein, is a type of article. An "article," as used herein, is literary work. As non-limiting examples, types of articles may include obituaries, weather reports, crime reports, real estate reports, stock reports, and the like. Content category 116 may be determined from a machine learning model. The machine learning model may include one or more of the machine learning models as described herein. Additionally and/or alternatively, the content category 116 may be determined using a machine-learning algorithm that may rely on rule-based logic, keyword analysis, natural language processing (NLP) techniques, or a combination thereof. Content category 116 may be from a user selection. A user selection may be received as a user input. A "user input," as used herein, is information received from a user. For example, a user input may be the selection or submission of data by a user. A user input may include data logging user interaction with a graphical user interface (GUI). For example, clicking an icon, selecting from a dropdown list, using a touch screen, textual entry, voice recognition, and the like. A "graphical user interface," as used herein, is a form of user interface that allows users to interact with electronic devices through graphical icons and audio indicator such as primary notation, instead of text-based UIs, typed command labels or text navigation.

Still referring to FIG. 1, computing device 104 is configured to receive a data file 120 containing content data 124. A "data file," as used herein, is a data store storing information to be used by a computer. Data file 120 may include any conventional file for storing data. Data file 120 may include an Excel file, a .csv file, a .txt file, and the like. "Content data," as used herein, is contextual information. Content data 124 may include a plurality of data related to a certain content category 116. As a non-limiting example, for a content category 116 of "obituary," content data 124 may include information such as names of people and their date of death. As a non-limiting example, content category 116 of "real estate," content data 124 may contain information such as addresses of houses, sale dates, and sale prices. In some embodiments, content data 124 may contain data simultaneously related to a plurality of content categories. For example, content data 124 may include data that is simultaneously related to an obituary type of article and a real estate type of article. Data file 120 may contain a plurality of headers 128 denoting types of data. As non-limiting examples, in the context of real estate, this may include, address, sale price, sale date, buyer, seller, property type, and the like. A "header," used herein, is categorization of data in a data file 120. This may relate to organizational classification of content data 124 in a file or data structure. For example, in a word document type of data file 120, there may be a series of columns containing content data 124, wherein each labeled column is a categorization of a type of data, such as content data 124 related to address, contact information, and the like.

Still referring to FIG. 1, in some embodiments, data file 120 may be received from a GUI or a user database 132. A "user database," as used herein, is a data structure containing data received from user. Databases as described through this disclosure may be implemented, without limitation, as a relational database, a key-value retrieval database such as a NOSQL database, or any other format or structure for use as a database that a person skilled in the art would recognize as suitable upon review of the entirety of this disclosure. Databases may alternatively or additionally be implemented using a distributed data storage protocol and/or data structure, such as a distributed hash table or the like. Databases may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. Computing device 104 may be configured to access database and/or retrieve data file 120 within user database 132 through one or more database queries. In other embodiments, receiving data file 120 may include one or more application program interface (API), wherein the application programming interface is a way for two or more devices and or programs to communicate with each other. In a non-limiting example, computing device 104 within apparatus 100 may be configured to gather data file 120 through the application programming interface. "Gather," as used herein, refers to extracting content data 124 and headers 128 from resources to form a data file 120.

Still referring to FIG. 1, computing device 104 may receive content category 116 and data file 120 through a representational state transfer application programming interface (REST API). An "application programming interface," as used herein, is a set of rules that define how applications or devices can connect to and communicate with each other. A "representational state transfer application programming interface," as used herein is an API that conforms to the representational state transfer architectural style. REST APIs as described in this disclosure may communicate via HTTP requests to perform standard database functions like creating, reading, updating, and deleting records within a resource, such as user database 132. For example, a REST API may use a GET request to retrieve a data file 120, a POST request to create data file 120, a PUT request to update data file 120, and/or a DELETE request to delete data file 120.

Still referring to FIG. 1, computing device 104 may receive content category 116 and data file 120 through RSS (RDF Site Summary or Really Simple Syndication) feeds. "RSS," as used herein, is a web feed that allows users and applications to access updates to websites in a standardized, computer-readable format. Websites may use RSS feeds to publish frequently updated information, such as blog entries, news headlines, episodes of audio and video series, or for distributing podcasts. An RSS document (called "feed", "web feed", or "channel") may include full or summarized text, and metadata, like publishing date and author's name. RSS document may include content category 116 and data file 120.

Still referring to FIG. 1 gathering data file 120 may include using a web crawler. Computing device 104 may train and utilize a web crawler to gather content data 124 and generate a web index of the content data 124. A "web crawler," as used herein, is a program that systematically browses the internet for the purpose of web indexing. A "web index," as used herein is information gathered by a web crawler indexed into a data structure. The web index may be the headers 128 of a data file 120. The web index may be stored in user database 132. Computing device 104 may generate a query to retrieve data indexed in a data structure as a function of the web crawler as described further below. The web crawler may be seeded with platform URLs, wherein the crawler may then visit the next related URL, retrieve the content, index the content, and/or measures the relevance of the content to the content category 116. In some embodiments, computing device 104 may generate a web crawler to scrape content data 124 from a plurality content category 116 related websites. For example, research websites, social media platforms, content-based forums, and the like. The web crawler may be seeded and/or trained with a website to begin the search. A web crawler may be generated by computing device 104. In some embodiments, the web crawler may be trained with information received from a user through a graphical user interface. In some embodiments, the web crawler may be configured to generate a web query. A web query may include a search criterion received from a user or generated by computing device 104. Additionally, the web crawler function may be configured to search for and/or detect one or more data patterns. A "data pattern" as used in this disclosure is any repeating forms of information. A data pattern may include repeating negative or positive reviews by people and the like. In some embodiments, the web crawler may be configured to determine the relevancy of a data pattern. Relevancy may be determined by a relevancy score. A relevancy score may be automatically generated by computing, received from a machine learning model, and/or received from the user. In some embodiments, a relevancy score may include a range of numerical values that may correspond to a relevancy strength of data received from a web crawler function. As a non-limiting example, a web crawler function may search the Internet for content data 124 related to current weather trends. The web crawler may return content data 124, such as, as non-limiting examples, news reports of skyrocketing temperatures, melting ice caps, and the like.

Still referring to FIG. 1, in some embodiments, gathering data file 120 may include processing documents in user database 132 using optical character recognition. Optical character recognition or optical character reader (OCR) includes automatic conversion of images of written (e.g., typed, handwritten or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases OCR may be an "offline" process, which analyses a static document or image frame. In some cases, handwriting movement analysis can be used as input to handwrite recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases. A line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in this disclosure.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, the at least a processor 108 may convert unstructured data into structured data using one or more of OCR process, natural language processing (NLP), and machine learning methods. In an embodiment, OCR process may be utilized to extract text from images, scanned documents, or handwritten content, allowing for the digitization and categorization of textual data. Without limitation the NLP may be applied to analyze, interpret, and structure textual information by identifying key entities, grammatical structures, or semantic relationships within the data. Additionally and/or alternatively, machine learning methods may be implemented to classify, segment, and standardize unstructured data based on learned patterns, contextual features, or predefined rules. This may be done using a language processing model. language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations. In some embodiments, creating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, computing device 104 is configured to import content data 124 from data file 120. Importing content data 124 may include importing data to be displayed through a GUI. Importing content data 124 may include assessing, by the computing device 104, headers 128 of the data file 120 associated with content category 116. In this case, computing device 104 may receive a data file 120 wherein the headers and content data 124 are already associated with a content category 116. For example, computing device 104 may receive a word file related to a news alert content category 116 containing associated headers such as times, location, death, source, and the like. Computing device 104 device may import content data 124 categorized under each header for use in processing methods as described further below to generate article.

Still referring to FIG. 1, in some embodiments, importing content data 124 from data file 120 may include classifying a plurality of headers 128 to desired data 136 of the content data 124, wherein desired data 136 is related to the content category 116. "Desired data," as used herein, is content data 124 relevant to a content category 116. Classifying the plurality of headers 128 may include determining a plurality of desired data headers 140. A "desired data header," as a used herein, is a header relevant to a content category 116. Desired data headers 140 may be determined by computing device 104 using machine-learning methods and language processing methods as described throughout this disclosure. For example, computing device 104 may receive a content category 116 of obituary and determine relevant content data 124 that may be used in generation of the obituary article. Computing device 104 may also determine relevant headers, as in categories of content data 124, required for the generation of the article. For example, headers related to desired data 136 for an obituary may include, "name," "date of death," "cause," and the like. In some embodiments, computing device 104 may receive desired data headers 140 associated with a content category 116 from an article database. An "article database," as used herein, is a data structure containing data used in the generation of an article. For example, the article database may include a content category 116 index containing desired data headers 140 associated with each content category 116. In some embodiments, computing device 104 may receive the desired data to classify to a desired data header 140 as a user input received through a GUI. For example, computing device 104 may receive data file 120, extract the desired data headers 140 contained within, and present the plurality of desired data headers 140 extracted to a user through a GUI. A user may then manually match desired data to the corresponding desired data header 140 by user input. For example, a user may enter through textual submission that the desired data corresponding to a "cause" desired data header 140 in an obituary as "stupidity". In some embodiments, computing device 104 may match desired data to the corresponding desired header using a machine-learning model as described further below.

Still referring to FIG. 1, in some embodiments, classifying the headers to the desired data may include using a matching machine-learning model, also referred to as s matching classifier. Matching machine learning model may include a classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Computing device 104 and/or another device may generate a classifier using a classification algorithm, defined as a processes whereby a computing device 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, computing device 104 may be configured to generate classifiers as used in this disclosure using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate classifiers as used in this disclosure using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, matching classifier 144 may be configured to classify desired data of content data 124 to the corresponding desired data header 140. For example, content data 124 such as "light rain" and "high wind" may be classified to a desired data header 140 of "type of weather." Matching classifier 144 may be trained using desired content training data correlating data file 120 to data files with headers matched to desired data 136, desired data headers 140 to content categories 116, and the like. In some embodiments, matching classifier 144 may be trained using data collected by the manual matching of the headers to the desired data as a function of a user input as discussed above. Matching classifier 144, as a function of the desired content training data, may output each desired data header 140 match to the corresponding desired data.

Still referring to FIG. 1, computing device 104 is configured to generate an article 148 as a function of the imported content data 124 and content category 116. Computing device 104 may generate article 148 utilizing an article module 152. An "article module," as used herein is a set of processing models working in tandem to generate an article. Article module may include a plurality of classifiers and machine-learning models or processes to create an article temples, classify data to the template, and optimize the linguistics of the article. In some embodiments, article module may include a template classifier, article classifier, language processing model, and/or a smoothing language filter as described further below.

Computing device 104 may use a template classifier to match content category 116 and/or contents of data file to a corresponding article template. An "article template," as used herein, is a data structure outlining data to be populated to create an article. For example, an article template for an obituary may include an intro (e.g. name of deceased, names of family members), discussion (e.g., cause of death, life biography), and a conclusion (e.g., name of cemetery, date of funeral) space. For example, template classifier may be trained by training data correlating a plurality of content category and data file types to corresponding article templates. Template classifier may receive content category 116 and data file 120, and output a corresponding article template. In some embodiments each content category 116 may have an article template stored in article database. In some embodiments, the article template may be repeated for every set of headers, desired, data, and the like the imported from data file 120. In some embodiments, computing device may additionally or alternatively use a language process model to classify contents of data file 120 to an appropriate article template. The article template output by the template classifier may then be used as input in an article classifier configured to match the contents of data to the corresponding spaces of the article temple. This may include designating the arrangement of content data 124 and headers 128. For example, the intro section of an obituary article template may prompt for the deceased name and name of family members. Article classifier may match corresponding content data by identifying words and phrases that match the prompt. In other words, article classifier may be a classifier configured to receive imported content data 124, such as the desired headers and corresponding desired data, and content category 116 as an input and output article. Article classifier may be trained by training data received from article database. Article training data may include data correlating imported content category 116 to an article template. Article training data may include a dictionary. A "dictionary," as used herein, is a data structure containing information related to linguistics. "Linguistics," as used herein, is the scientific study of human language. The dictionary may include rules and examples regarding syntax (rules governing the structure of sentences); semantics (meaning); morphology (structure of words); phonetics (speech sounds and equivalent gestures in sign languages); phonology (the abstract sound system of a particular language); pragmatics (how social context contributes to meaning), and the like. Article training data may also include boilerplate data. "Boilerplate data," as used herein, is data regarding to standardized text of an article that can be used repeatedly without making major changes. In some cases, boilerplate data may be selected by the user. In a non-limiting example, boilerplate data may be received from a user. In a non-limiting example, user may be able to customize boilerplate data by editing text within boilerplate data. In some embodiments, boilerplate data may include, without limitation, an AI disclaimer, links to a membership service, links to a homepage, and the like thereof. In some cases, boilerplate data may be placed at the end of article. In a non-limiting example, generating article may include inserting boilerplate correlated to a content category 116. In some embodiments, boilerplate data may include a signature of the user (i.e., author or individual who generates article) and/or a copyright notice or other legal notice.

Still referring to FIG. 1, article 148 may then go through a smoothing language filter. A "smoothing language filter," as used herein, is a machine-learning model configured to identify a degree of change between language elements of an article. For example, smoothing language filter may access how "jarring," or "sharp," the transition is from one word to the next word or a phrase to the next phrase. Smoothing language filter may be used to assess the linguistic flow of article 148 using a scoring algorithm based on the degree of change. For example, the scoring algorithm may rate the linguistic flow of content data 124 in each section or header of article 148 on a scale of 1-10, a percentage, linguistic metric and the like. The replacement, or rearrangement of words and phrases may be modified based on the score. For example if a discussion section of article 148 scores lower than a predetermined threshold set by the computer or a user input, computing device may reiteratively generate the section of the article using methods as described above until the score is acceptable. For example, article classifier may receive the low ranked section as an input or as training data as an example regarding an arrangement of words or phrases to avoid. Smoothing language filter may be trained by training data correlating scores of the scoring algorithm to a plurality of articles the article database. In some embodiments, scoring the linguistic flow may use a neural network or deep learning techniques as described further below.

Still referring to FIG. 1, in some embodiments, the degree of change may be assessed using fuzzy logic. In fuzzy logic, values of system variables may be expressed in linguistic terms such as "jarring," "sharp" and "enticing," which designate regions of interest in a data set. These linguistic expressions are referred to as fuzzy sets in this application. A fuzzy set may also be used to show degree of match between fuzzy sets and may be used to rank one language element over another. Each metric of a linguistic scoring algorithm may be represented as a fuzzy set. For example, a phonetics fuzzy set, syntax fuzzy, semantics fuzzy set, and the like. These plurality of fuzzy sets may be used to assess each section of content data 124 in article 148. For example the intro section may presented as phonetics, syntax, and semantics fuzzy sets. Each linguistic metric to be compared to ideal linguistic metrics may be represented using a linguistic variable on a range of potential numerical values, where values for the linguistic variable may be represented as fuzzy sets on that range; where values for the linguistic variable may be represented as fuzzy sets on that range; a "natural" or "good" fuzzy set may correspond to a range of values that can be characterized as ideal, while other fuzzy sets may correspond to ranges that can be characterized as mediocre, bad, or other less-than-ideal ranges and/or values. Fuzzy logic may combine such linguistic variable values according to one or more fuzzy logic rules, including training data as disclosed herein (i.e., dictionary), any type of fuzzy logic and/or rules as described in this disclosure, to determine a degree of membership in one or more output linguistic variables having values representing ideal linguistic flow, mediocre or middling linguistic flow, and/or low or poor linguistic flow. Computing device 104 may modify sections of article 148 based on the plurality of linguistic variable metrics. For example if the syntax fuzzy set of the conclusion section of article 148 scored "poor", below a predetermined threshold, then content data 124 of that section may be regenerated using the article classifier as described above. In some embodiments, linguistics scores of the fuzzy sets may be added as training data of the article classifier as examples of arrangement of words or phrases to avoid or model.

With continued reference to FIG. 1, in some embodiments, generating article 148 may include using a language processing module. Language processing module may include any hardware and/or software module. Language processing module may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. Tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

With continued reference to FIG. 1, language processing module may operate to produce a language processing model. Language processing model may include a program automatically generated by computing device 104 and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device 104, or the like.

With continued reference to FIG. 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs has used herein are statistical models with inference algorithms that that may be applied to the models. In such models, a hidden state to be estimated may include an association between an extracted word, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

With continued reference to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

With continued reference to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language processing module and/or computing device 104 may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into computing device 104. Documents may be entered into a computing device 104 by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

With continued reference to FIG. 1, in some embodiments, language processing module may include a grammatical checker. As used in this disclosure, a "grammatical checker" is a component of language processing module that attempts to verify text (i.e., content data 124) for grammatical correctness. In a non-limiting example, grammatical checker may include a program that runs simultaneously in the background of the runtime environment of language processing module while generating article. Grammatical checker may automatically correct article during, or after article generation. Correcting article may include, without limitation, grammar, spelling, tense, word choice, and the like thereof.

With continued reference to FIG. 1, in some embodiments, generating the article may be consistent with aspects of generating an activity article as disclosed in U.S. Non-provisional application Ser. No. 17/993,108, filed on Nov. 23, 2022, and entitled, APPARATUS AND METHOD FOR GENERATING AN ACTIVITY ARTICLE," the entirety of which is incorporated by reference herein.

Still referring to FIG. 1, generating the article may include editing the article as a function of user input. For example, the user may be able to edit the generated article through a GUI. In some embodiments, the user may be able to edit the generated article using a n online rich text editor. An "online rich-text editor," is an interface for editing rich text within web browsers, which presents the user with a "what-you-see-is-what-you-get" (WYSIWYG) editing area. The aim is to reduce the effort for users trying to express their formatting directly as valid HTML markup.

Still referring to FIG. 1, in some embodiments, generating article 148 may further include generating an augmented article. "Augmented," as used herein, refers to the increase of quality of an article. For example, the augmented article may be a finely-tuned version of article 148 based on a trait such as syntax, writing, style impact, and the like. Generating an augmented article may include inputting article generated by article classifier and/or the language processing model into an artificial neural network, wherein the neural network outputs the augmented article. A "neural network," also known as an artificial neural network, is a network of "nodes," or data structures having one or more inputs, one or more outputs, and a function determining outputs based on inputs, as described further below. In some embodiments, input to the neural network may additionally include a prompt. A "prompt," as used herein, is a topic of focus in augmenting an article. The prompt may be any instruction to the neural network relating to the desired content or format of the augmented article. For example, prompt may indicate a desired reading level, a targeted locality, a level of humor, a length, a style of writing, and the like. In some embodiments, the neural network may include a Generative Pre-trained Transformer 3 (GPT-3). A "GPT-3," as used herein, is an autoregressive language model that uses deep learning to produce human-like text. Given an initial text as prompt, it may produce text that continues the prompt.

Still referring to FIG. 1, generating an augmented article may include training and/or utilizing a large language model (LLM). A "large language model," as used herein, is a deep learning algorithm that can recognize, summarize, translate, predict and/or generate text and other content based on knowledge gained from massive datasets. LLMs may be trained on large sets of data; for example, training sets may include greater than 1 million words. Training sets may be drawn from diverse sets of data such as, as non-limiting examples, novels, blog posts, articles, emails, and the like. Training sets may include a variety of subject matters, such as, as nonlimiting examples, medical tests, romantic ballads, beat poetry, emails, advertising documents, newspaper articles, and the like. LLMs, in some embodiments, may include GPT, GPT-2, GPT-3, and other language processing models. LLM may be used to augment the text in an article based on a prompt. Training data may correlate content data to plurality of prompts. Training data may correlate elements of a dictionary related to linguistics, as described above, to a prompt. LLM may include a text prediction based algorithm configured to receive an article and apply a probability distribution to the words already typed in a sentence to work out the most likely word to come next in augmented articles. For example, if the words already typed are "Nice to meet", then it is highly likely that the word "you" will come next. LLM may output such predictions by ranking words by likelihood or a prompt parameter. For the example given above, the LLM may score "you" as the most likely, "your" as the next most likely, "his" or "her" next, and the like.

Still referring to FIG. 1, LLM may include an attention mechanism, utilizing a transformer as described further below. An "attention mechanism," as used herein, is a part of a neural architecture that enables a system to dynamically highlight relevant features of the input data. In natural language processing this may be a sequence of textual elements. It may be applied directly to the raw input or to its higher-level representation. An attention mechanism may be an improvement to the limitation of the Encoder-Decoder model which encodes the input sequence to one fixed length vector from which to decode the output at each time step. This issue may be seen as a problem when decoding long sequences because it may make it difficult for the neural network to cope with long sentences, such as those that are longer than the sentences in the training corpus. Applying a attention mechanism, LLM may predict the next word by searching for a set of position in a source sentence where the most relevant information is concentrated. LLM may then predict the next word based on context vectors associated with these source positions and all the previous generated target words, such as textual data of a dictionary correlated to a prompt in a training data set. A "context vector," as used herein, are fixed-length vector representations useful for document retrieval and word sense disambiguation. In some embodiments, LLM may include encoder-decoder model incorporating an attention mechanism.

Still referring to FIG. 1, LLM may include a transformer architecture. In some embodiments, encoder component of LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, LLM and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1, an attention mechanism may represent an improvement over a limitation of the Encoder-Decoder model. The encoder-decider model encodes the input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, LLM may predict the next word by searching for a set of position in a source sentence where the most relevant information is concentrated. LLM may then predict the next word based on context vectors associated with these source positions and all the previous generated target words, such as textual data of a dictionary correlated to a prompt in a training data set. A "context vector," as used herein, are fixed-length vector representations useful for document retrieval and word sense disambiguation.

Still referring to FIG. 1, an attention mechanism may include generalized attention self-attention, multi-head attention, additive attention, global attention, and the like. In generalized attention, when a sequence of words or an image is fed to LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, LLM may pick up particular parts at different positions in the input sequence and over time compute an initial composition of the output sequence. In multi-head attention, LLM may include a transformer model of an attention mechanism. Attention mechanisms, as described above, may provide context for any position in the input sequence. For example, if the input data is a natural language sentence, the transformer does not have to process one word at a time. In multi-head attention, computations by LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), LLM may make use of attention alignment scores based on a number of factors. These alignment scores may be calculated at different points in a neural network. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, LLM may either attend to all source words or predict the target sentence, thereby attending to a smaller subset of words.

With continued reference to FIG. 1, multi-headed attention in encoder may apply a specific attention mechanism called self-attention. Self-attention allows the models to associate each word in the input, to other words. So, as a non-limiting example, the LLM may learn to associate the word "you", with "how" and "are". It's also possible that LLM learns that words structured in this pattern are typically a question and to respond appropriately. In some embodiments, to achieve self-attention, input may be fed into three distinct fully connected layers to create query, key, and value vectors. The query, key, and value vectors maybe fed through a linear layer; then, the query and key vectors may be multiplies using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

With continued reference to FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

With continued reference to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With continued reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am", decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filed with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves "zero" attention scores for "future tokens."

With continued reference to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classier will be of size 10,000. The output of this classifier may be fed into a softmax layer which may serve to produce probability scores between zero and one. The index may be taken of the highest probability score in order to determine a predicted word.

With continued reference to FIG. 1, decoder may take this output and add it to the decoder inputs. Decoder may continue decoding until a token is predicted. Decoder may stop decoding once it predicts an end token.

With continued reference to FIG. 1, in some embodiment, decoder may be stacked N layers high, with each layer taking in inputs from the encoder and layers before it. Stacking layers may allow LLM to learn to extract and focus on different combinations of attention from its attention heads.

Still referring to FIG. 1, in some embodiments, generating article 148 may further include generating an aggregate article. An "aggregate article," is an article produced by the aggregation of a plurality of articles. Computing device 104 may be configured to generate an aggregate article from a plurality of related articles generated or received by computing device 104. In some embodiments, this may be done periodically—i.e. monthly, weekly, yearly, and the like an update to the original article or as a newly generated article. As a non-limiting example, a content category 116 of "real estate," the augmented article may address trends in real estate (like sale prices) during the period. Computing device 104 may generate the aggregated article using article classifier, language processing model, and the neural network as described above. For example, a plurality of related articles may be inputted into article classifier, wherein trends identified using a language processing model is part of the article training data, and article classifier is configured to output the aggregated article. The aggregated article may then be augmented using a neural network as described above.

With continued reference to FIG. 1, computing device 104 is configured to export article. As used in this disclosure, "exporting" is converting, outputting, or otherwise exporting article using computing device 104. In some embodiments, exporting article may include converting article into any data structure described in this disclosure. In some embodiments, article may be exported through RSS feeds to a website as described above. As a nonlimiting example, articles may be added to an RSS feed. In some embodiments, exporting article may include outputting article in a format such as, without limitation, an HTML file, pdf file, text document, word document, and the like thereof. In a non-limiting example, computing device 104 may convert text within article into one or more HTML tags using a representational state transfer (REST) API, wherein the REST API is an API that conforms to constraints of REST architectural style (i.e., client-server architecture). User (i.e., client) may initiate conversion of article by requesting server through REST API. Requesting server may include client sending a request such as, without limitation, a POST request and the like. Server may post converted one or more HTML tags to a customer relationship management (CRM) platform, wherein the CRM platform is a system that administer a business or other organization interactions with users through data analysis. CRM platform may include a back-office system containing a plurality of automated processes that is executable by computing device 104. CRM platform may send a unique identifier of exported article, a HTML file containing one or more converted HTML tags, and a URL to exported article through an email.

Figure 2:
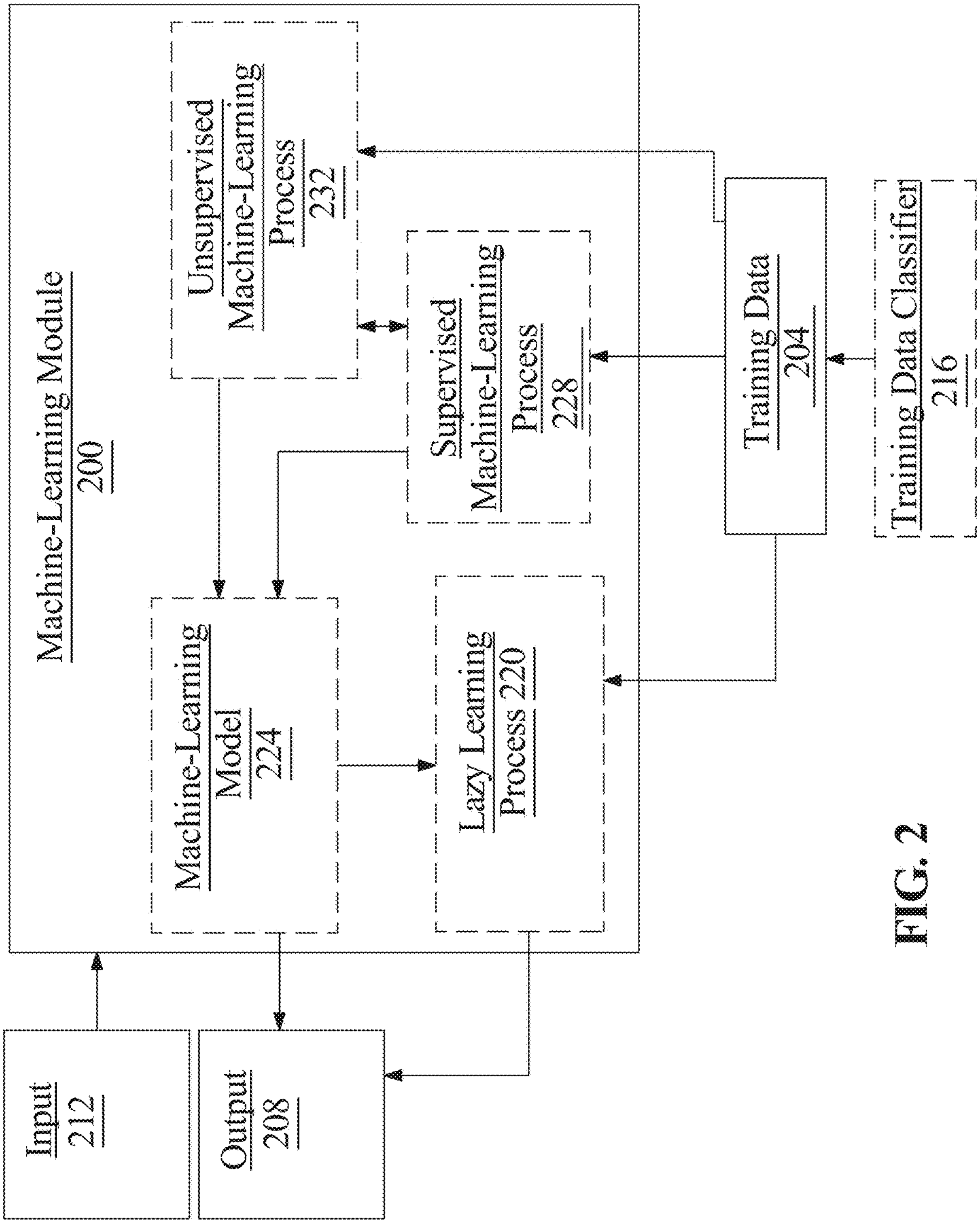
FIG. 2 is a block diagram of exemplary embodiment of a machine learning model.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier generated by a machine learning algorithm known as a "classification algorithm". Machine-learning module 200 may generate a classifier using a classification algorithm, defined as a processes whereby a computing device and/or any module and/or component operating thereon derives a classifier from training data 204.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include any inputs and outputs described throughout this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 3:
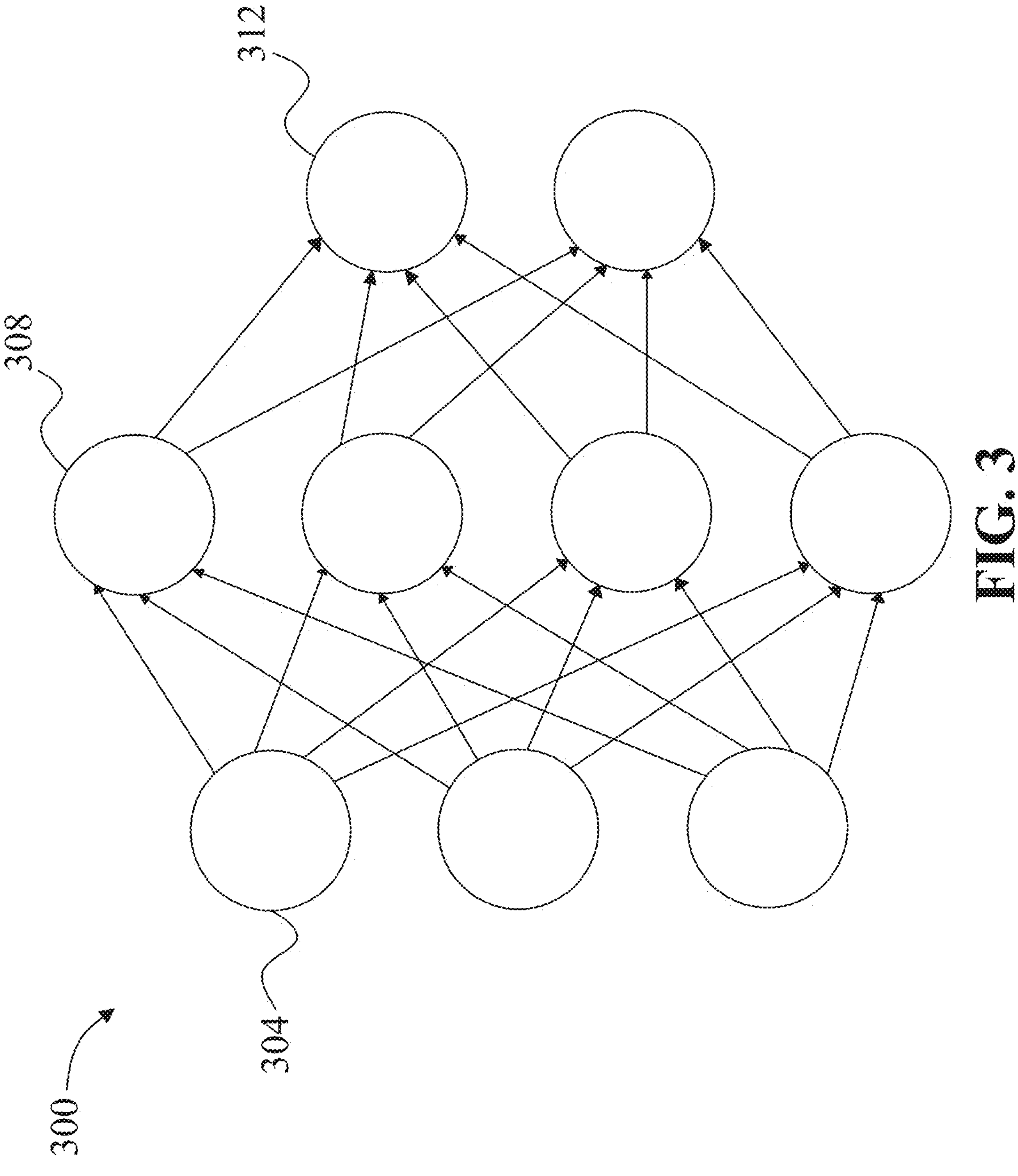
FIG. 3 illustrates an exemplary nodal network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 4:
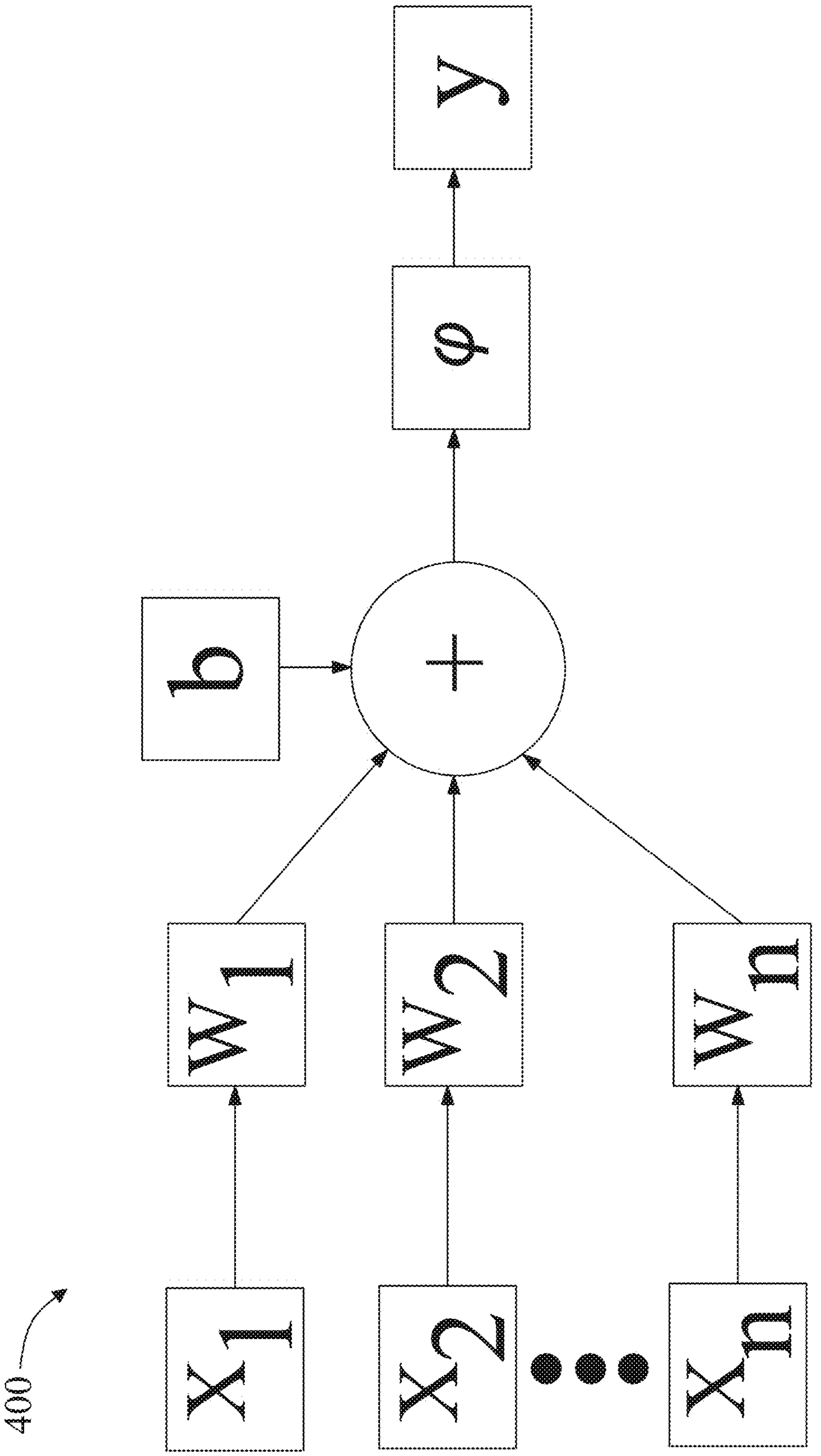
FIG. 4 is a block diagram of an exemplary node of a neural network.

Referring now to FIG. 4, an exemplary embodiment of a node of a neural network is illustrated. A node may include, without limitation, a plurality of inputs xi that may receive numerical values from inputs to a neural network containing the node and/or from other nodes. Node may perform a weighted sum of inputs using weights wi that are multiplied by respective inputs xi. Additionally, or alternatively, a bias b may be added to the weighted sum of the inputs such that an offset is added to each unit in the neural network layer that is independent of the input to the layer. The weighted sum may then be input into a function p, which may generate one or more outputs y. Weight wi applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights wi may be determined by training a neural network using training data, which may be performed using any suitable process as described above.

Figure 5:
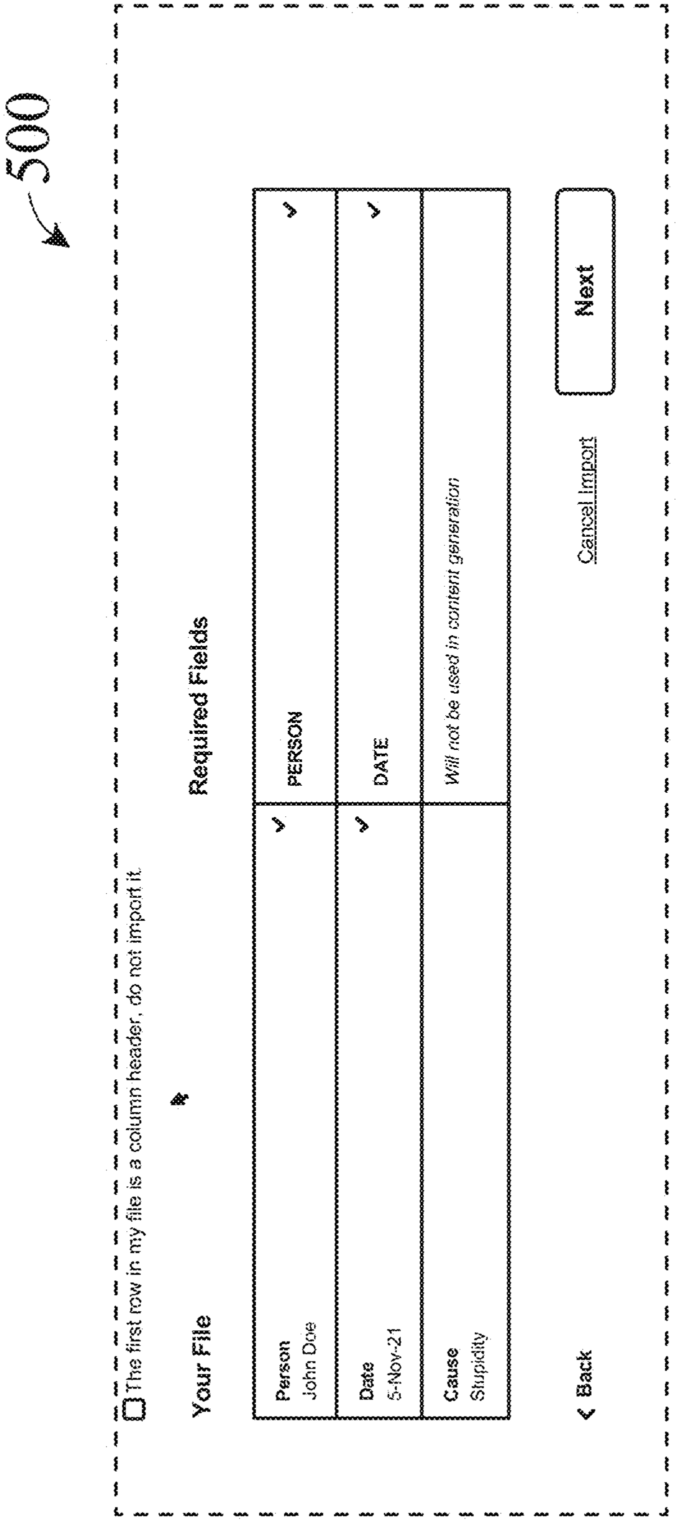
FIG. 5 illustrates a GUI for importing content data.

Referring now to FIG. 5, is exemplary embodiment of a GUI 500 for importing content data 124 from data file 120. GUI 500 may present a plurality of desired data headers 140 (i.e., "Person," "Date," and "Cause" in separate boxes (i.e., rows or columns), wherein each desired data header 140 is related to a content category 116. GUI 500 may present desired data headers 140 required in the generation of article 148. In some embodiments, GUI 500 may confirm desired data headers 140 to be used in article by clicking of each box. Clicking on box may induce a check mark or highlight demonstrating user selections. In some embodiments, each box may present the corresponding desired data 136 under desired data header 140 as matched by matching machine-learning model (i.e., "John Doe" matched to "Person," "5-Nov-2" matched to "Date," and "Stupidity" matched to "Cause"). Each box may be edited through textual submission. For example, desired data may be re-written or submitted by a user through a text box. In some embodiments, boxes not selected may be grayed out to show distinctions. In some embodiments, additional boxes may be added by user input through menu selection. For example, a menu may present a plurality of headers that mat be imported that a user may select to add to the importation process. In some embodiments, each box may be displayed in order of implantation into article 148. For example an arrangement of desired data headers 140 of "person," may come before "date," and "cause." Article 148 may read in order of the name of the person, date of death, and cause of death. A user may prioritize the order of boxes black click and drag function, and the like.

Figure 6:
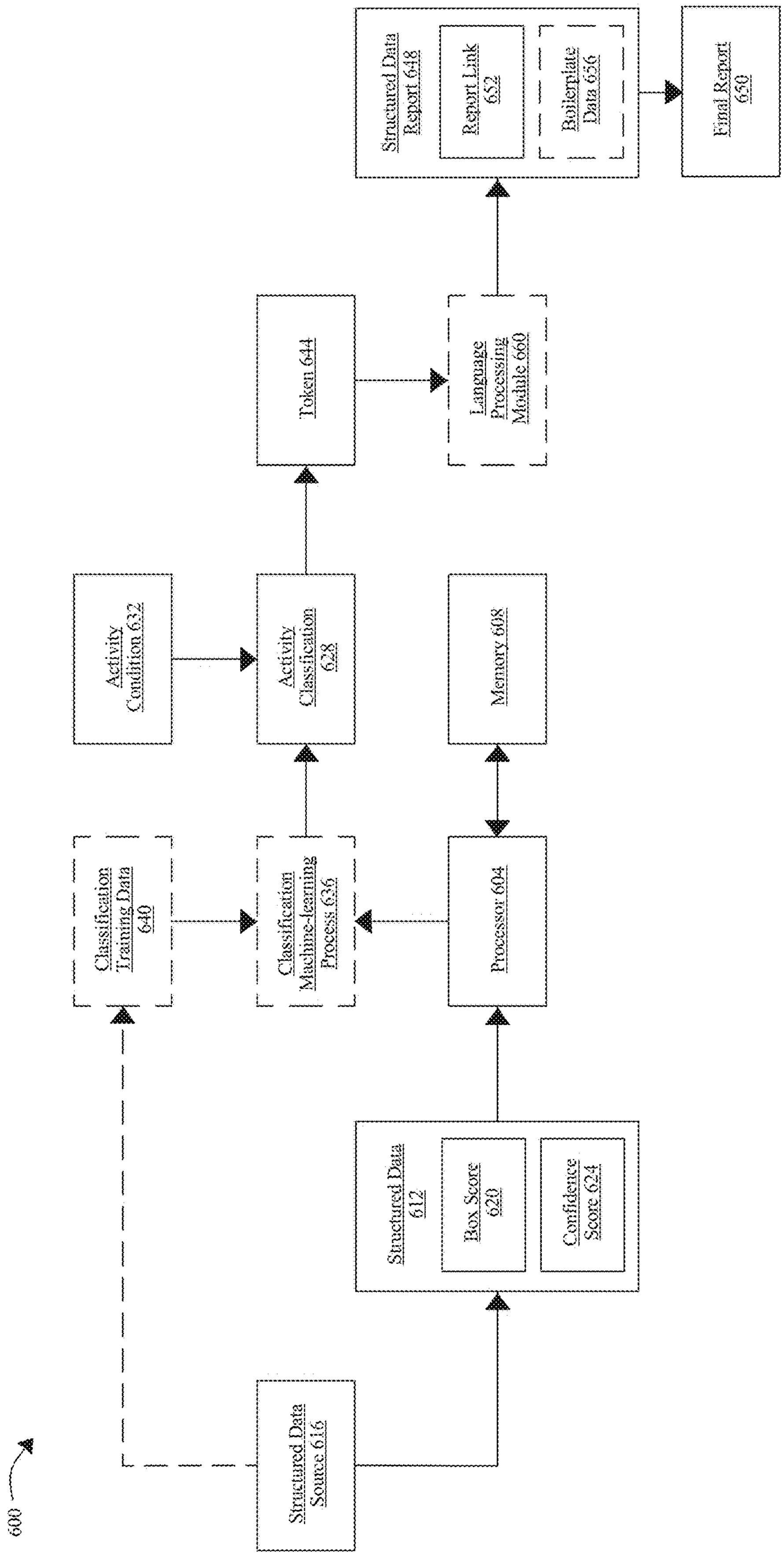
FIG. 6 is a block diagram of an exemplary embodiment of an apparatus for generating an activity article.

Referring now to FIG. 6, an exemplary embodiment of an apparatus 600 for generating a report is illustrated. Apparatus includes a processor 604 and a memory 608 communicatively connected to the processor 604. Processor 604 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 604 may include a single computing device operating independently, or may include two or more computing device operating in concert, in parallel, sequentially or the like; two or more computing devices may be included together in a single computing device or in two or more computing devices. Processor 604 may interface or communicate with one or more additional devices as described below in further detail via a network interface device. Network interface device may be utilized for connecting processor 604 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 604 may include but is not limited to, for example, a computing device or cluster of computing devices in a first location and a second computing device or cluster of computing devices in a second location. Processor 604 may include one or more computing devices dedicated to data storage, security, distribution of traffic for load balancing, and the like. Processor 604 may distribute one or more computing tasks as described below across a plurality of computing devices of computing device, which may operate in parallel, in series, redundantly, or in any other manner used for distribution of tasks or memory between computing devices. Processor 604 may be implemented using a "shared nothing" architecture in which data is cached at the worker, in an embodiment, this may enable scalability of apparatus 600 and/or computing device.

With continued reference to FIG. 6, processor 604 may be designed and/or configured to perform any method, method step, or sequence of method steps in any embodiment described in this disclosure, in any order and with any degree of repetition. For instance, processor 604 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 604 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 6, as used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, apparatus and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 6, processor 604 is configured to receive structured data 612 from structured data source 616. For the purposes of this disclosure, "structured data" is data that has been organized into a standardized format. For the purposes of this disclosure, a "structured data source," is a data source that holds structured data.

With continued reference to FIG. 6, structured data 612 may include information regarding noteworthy events. Structured data 612 may include information regarding one or more of financial events, management events, newsworthy events, and the like. Structured data 612 may include information from news reports, social media posts, police reports, user inputs, and the like. Structured data 612 may describe the parties involved, locations, times, detailed accounts of the events, and the like. Financial events can encompass a wide range of occurrences within the financial world, such as market movements, economic reports, corporate actions, policy changes, and more. These events can be local, regional, or global in scope and may have positive or negative consequences for various stakeholders. Examples of financial events may include economic indicators, corporate earnings reports, central bank actions, mergers and acquisitions, political events, natural disasters, stock market crashes, global events, and the like. Structured data 612 associated with financial events may outline a detailed accounting of the event. Structured data 612 may also include information regarding who will be affected by the financial event and whether this event is positive or negative. A newsworthy event is any occurrence or happening that is of significant interest, importance, or relevance to the public and has the potential to be reported and covered by news media outlets. Newsworthy events may also include events that are noteworthy to certain demographic groups. These events often have a widespread impact on society, communities, or individuals and can include a wide range of topics, such as politics, economics, science, technology, social issues, entertainment, and sports.

With continued reference to FIG. 6, as used in this disclosure, "receive" means accepting, collecting, or otherwise receiving input from activity data source described in further detail below. As used in this disclosure, "activity data" is structured data concerning an activity. As used in this disclosure, an "activity" is an event, phenomena, or occurrence that is noteworthy or newsworthy. In a non-limiting example, activity data may include data regarding sporting events. An activity may include scored event that one or more people may partake in. In some cases, sporting event may include, without limitation, football, basketball, car racing, Olympic sports, soccer, volleyball, baseball, softball, cricket, darts, bowling, and the like thereof. In another non-limiting example, activity data may include data regarding to a gaming event. In some cases, gaming event may include chess, darts, cards, multiplayer video games, and the like thereof. In a non-limiting example, activity data may include, without limitation, game details, team information, player information, time duration, and the like thereof. In another non-limiting example, activity data may include a minute-by-minute sporting event commentary script. In some embodiments, activity data may include a box score 620. In some embodiments, structured data 612 may include a box score 620. As used in this disclosure, a "box score" is a structured summary of results from a sporting event or activity. In some embodiments, box score 620 may break the activity data into temporal divisions of the sporting event, such as, without limitation, quarters, halves, periods, frames, innings, sets, and the like thereof. In a non-limiting example, a box score 620 may include a data element similar to "Team A x: Team B y," wherein the data element may compare team A score x to team B score y. In some embodiments, the score may be the points scored by the end of a temporal division. In some embodiments, the score may be the points scored during a temporal division. In some embodiments, box score 620 may include a list of events. List of events may include, for example, a list of the scoring events or other significant events, such as penalties, injuries, turnovers, and the like.

With continued reference to FIG. 6, in some embodiments, structured data 612 or activity data may further include a confidence score 624. As used in this disclosure, a "confidence score" is a quantitative measurement of the accuracy of the data such as, without limitation, structured data 612. Confidence score 624 may be on a scale of x to y, wherein x may represent a minimum confidence score and y may represent a maximum confidence score; for instance, confidence score 624 may be on a scale of 0 to 100, wherein a confidence score close to 0 may be a low confidence score, and a confidence score close to 100 may be a high confidence score. Low confidence score may indicate structured data 612 is less reliable, while high confidence score may indicate structured data 612 is more reliable. In some embodiments, structured data 612 may include a plurality of confidence scores 624, wherein each confidence score of plurality of confidence scores 624 may associate with a single box score 620. In a non-limiting example, a confidence score 624 may be generated by comparing two or more news reports, police reports, or social media posts to one another. If the facts associated with each report are aligned the confidence score 624 may be high, alternatively if the facts from each report are varied the confidence score may be low. An overall confidence score may be calculated, generated, or determined as a function of plurality of confidence scores 624. Additionally, or alternatively, confidence score 624 may be a user-defined score. In a non-limiting example, a user may review structured data 612 and determine one or more confidence score 624 based on the user's intuition. In other embodiments, confidence score 624 may be obtained from or received along with structured data 612 from activity data source described in further detail below.

With continued reference to FIG. 6, in some embodiments, structured data 612 and/or any data/information described in this disclosure may be present as a vector. As used in this disclosure, a "vector" is a data structure that represents one or more quantitative values and/or measures of home resource data. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 60, 65] may be treated as equivalent, for purposes of this disclosure, as a vector represented as [6, 2, 3]. Vectors may be more similar where their directions are more similar, and more different where their directions are more divergent, for instance as measured using cosine similarity as computed using a dot product of two vectors; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes.

With continued reference to FIG. 6, in some embodiments, structured data 612 and/or any other data/information described in this disclosure may be present as a dictionary. As used in this disclosure, a "dictionary" is a data structure containing an unordered set of key value pairs. In this disclosure, a "key value pair" is a data representation of a data element such as, without limitation, entries of box score 620, confidence score 624, financial report, management report, any other information within structured y data 612, and the like thereof. In some cases, dictionary may be an associative memory, or associative arrays, or the like thereof. In a non-limiting example, dictionary may be a hash table. In an embodiment, key value pair may include a unique key, wherein the unique kay may associate with one or more values. In another embodiment, key value pair may include a value, wherein the value may associate with a single key. In some cases, each key value pair of set of key value pairs in dictionary may be separated by a separator, wherein the separator is an element for separating two key value pairs. In a non-limiting example, separator may be a comma in between each key value pairs of plurality of key value pairs within dictionary. In another non-limiting example, a dictionary may be expressed as "{first key value pair, second key value pair}," wherein the first key value pair and the second key value pair may be separate by a comma separator, and wherein both first key value pair and second key value pair may be expressed as "first/second key: first/second value." In a further non-limiting example, activity data 612 may be present as a dictionary: "{x: A, y: B}," wherein x may be a first entry correspond to a box score A and y may be a second entry correspond to a confidence score B. Additionally, or alternatively, dictionary may include a term index, wherein the term index is a data structure to facilitate fast lookup of entries within dictionary (i.e., index). In some cases, without limitation, term index may use a zero-based indexing, wherein the zero-based indexing may configure dictionary to start with index 0. In some cases, without limitation, term index may use a one-based indexing, wherein the one-based indexing may configure dictionary to start with index 1. In other cases, without limitation, term index may use a n-based indexing, wherein the n-based indexing may configure dictionary to start with any index from 0 to n. Further, term index may be determined/calculated using one or more hash functions. As used in this disclosure, a "hash function" is a function used to map a data of arbitrary size to a fixed-size value. In some cases, a fixed-size value may include, but is not limited to, hash value, hash code, hash digest, and the like. In a non-limiting example, activity data 612 may be present as a dictionary containing a plurality of hashes generated using hash function such as, without limitation, identity hash function, trivial hash function, division hash function, word length folding, and the like, wherein each hash of plurality of hashes may represents a single box score 620.

With continued reference to FIG. 6, in other embodiments, structured data 612 and/or any other data/information described in this disclosure may be present as any other data structure such as, without limitation, tuple, single dimension array, multi-dimension array, list, linked list, queue, set, stack, dequeue, stream, map, graph, tree, and the like thereof. In some embodiments, structured data 612 and/or any other data/information described in this disclosure may be present as a combination of more than one above data structures. In a non-limiting example, structured data 612 may include a dictionary of lists. As will be appreciated by persons having ordinary skill in the art, after having read the entirety of this disclosure, the foregoing list is provided by way of example and other data structures can be added as an extension or improvements of apparatus 600 disclosed herein. In some embodiments, without limitation, data structure may include an immutable data structure, wherein the immutable data structure is a data structure that cannot be changed, modified, and/or updated once data structure is initialized. In other embodiments, without limitation, data structure may include a mutable data structure, wherein the mutable data structure is a data collection that can be changed, modified, and/or updated once data structure is initialized. Additionally, or alternatively, structured data 612 and/or any other data/information described in this disclosure may include an electric file format such as, without limitation, txt file, JSON file, XML file, word document, pdf file, excel sheet, image, video, audio, and the like thereof.

With continued reference to FIG. 6, in some cases, data within data structure described above may be sorted in a certain order such as, without limitation, ascending order, descending order, and the like thereof. In a non-limiting example, sorting data within structured data 612 may include using a sorting algorithm. In some cases, sorting algorithm may include, but is not limited to, selection sort, bubble sort, insertion sort, merge sort, quick sort, heap sort, radix sort, and the like thereof. As will be appreciated by persons having ordinary skill in the art, after having read the entirety of this disclosure, the foregoing list is provided by way of example and other sorting algorithm can be added as an extension or improvements of apparatus 600 disclosed herein.

With continued reference to FIG. 6, as used in this disclosure, an "activity data source" is a source of structured data 612. An structured data source 616 may include one or more documents related to the activity. Examples of documents may include police reports, news reports, social media posts, emails, financial reports, memos, notes, quotes, and the like. In some embodiments, without limitation, structured data source 616 may include information provided from one or more users. In some cases, users may include a game player, activity organizer, application user, any individual who uses apparatus 600, and the like. In a non-limiting example, box score 620 within structured data 612 of a sporting event may be manually updated by people attending the sporting event. In some embodiments, apparatus 600 may receive financial data from structured data source 616. In some embodiments, apparatus 600 may receive real estate data from structured data source 616. In some embodiments, real estate data may include sales data. In some embodiments, real estate data may include tax assessment data. Additionally, or alternatively, structured data 612 may include one or more report configurations, wherein one or more report configurations are parameter used to generate structured data report 648 described in further detail below. In some embodiments, receiving structured data 612 may include receiving structured data 612 from the user. In a non-limiting example, user may input a plurality of structured data 612 containing one or more article configurations such as, without limitation, number of authors, coverage area, confidence score 624, dynamic degree, and the like to processor 604 and/or Language processing module 660 described in further detail below. In an embodiment, an structured data source 616 may be converted into machine-encoded text using an optical character reader (OCR).

Still referring to FIG. 6, in some embodiments, optical character recognition or optical character reader (OCR) includes automatic conversion of images of written (e.g., typed, handwritten, or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 6, in some cases, OCR may be an "offline" process, which analyses a static document or image frame. In some cases, handwriting movement analysis can be used as input for handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 6, in some cases, OCR processes may employ pre-processing of image components. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from the background of the image component. In some cases, binarization may be required for example if an employed OCR algorithm only works on binary images. In some cases. a line removal process may include the removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify a script allowing an appropriate OCR algorithm to be selected. In some cases, a character isolation or "segmentation" process may separate signal characters, for example, character-based OCR algorithms. In some cases, a normalization process may normalize the aspect ratio and/or scale of the image component.

Still referring to FIG. 6, in some embodiments, an OCR process will include an OCR algorithm. Exemplary OCR algorithms include matrix-matching process and/or feature extraction processes. Matrix matching may involve comparing an image to a stored glyph on a pixel-by-pixel basis. In some cases, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at the same scale as input glyph. Matrix matching may work best with typewritten text.

Still referring to FIG. 6, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted features can be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 5-7. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 6, in some cases, OCR may employ a two-pass approach to character recognition. The second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 2, 3, and 4.

Still referring to FIG. 6, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make use of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 6, in some embodiments, structured data source 616 may include a data store such as, without limitation, a database. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. In a non-limiting example, a scheduler may store structured data 612 at a specified time after event ends in database. Processor 604 may be configured to access database and/or retrieve structured data 612 within database through one or more database queries. In other embodiments, structured data source 616 may include one or more application program interface (API), wherein the application programming interface is a way for two or more devices and or programs to communicate with each other. In a non-limiting example, processor 604 within apparatus 600 may be configured to fetch structured data 612 through sport data feed application programming interface at a specific end-point.

With continued reference to FIG. 6, processor 604 is further configured to determine an activity classification 628 as a function of structured data 612. As used in this disclosure, an "activity classification" is a type of an activity. The activity may include, without limitation, sporting events described above. In a non-limiting example, activity classification 628 may include "blowout victory," "come-from-behind win," "huge loss," "close game," "overtime thriller," and/or the like. An activity classification 628 may include classifying the activity as a "financial activity," "managerial activity," "sports activity," "political activity" "newsworthy activity," and the like. Activity classification 628 may include "unprofitable quarter," "profitable quarter," "good year-over-year growth," and the like. Activity classification 628 may include "ineffective employee," "understaffed company," and the like. Activity classification 628 may include "prices increasing," "prices holding steady," "buyer's market," "seller's market," and the like. An activity classification 628 may additionally classify the activity according to the people, entities, organizations, and the like that are involved with the activity. In some embodiments, determining activity classification 628 may include applying a plurality of activity conditions 632 to structured data 612. As used in this disclosure an "activity condition" is a circumstance affecting the activity. In a non-limiting example, activity condition 632 may include one or more circumstance that affect an activity to fall into one or more categories such as, without limitation, activity classification 628 described above. In some embodiments, activity condition 632 may use structured data 612 that is broken into temporal divisions, such as box score 620, days, weeks, hours, etc., to determine activity classification 628.

With continued reference to FIG. 6, an activity classification 628 may include an activity identifier. As used in the current disclosure, an "activity identifier" is an identification of one or more key facts related to the activity. Key facts in an activity may refer to essential pieces of information that provide a concise and relevant summary of the activity. These facts are crucial for understanding the nature, scope, and outcomes of the activity. When reporting or documenting an activity, presenting key facts allows readers or stakeholders to grasp the most important aspects quickly. Key facts may include the duration, summary, outcomes, resolutions, challenges, resource utilization, and the like of the activity. Activity identifier may include identifying the date and time the activity took place, or will take place, help establish the temporal context of the activity. Additionally, the activity identifier may include an identification of a specific venue or location where the activity occurred is mentioned to understand its geographical context. An activity identifier may include identifying primary purpose or goal of the activity is stated. This may include an explanation of why the activity is significant or newsworthy to the reader. An activity identifier may include may identify the participants, individuals, groups, entities, and the like that are involved in the activity, such as team members, attendees, players, teams, companies, sporting leagues, or stakeholders, are listed. In a non-limiting example, an activity identifier may include concise summary of what happened during a financial event. This should include the primary activities or actions that occurred, such as a change in interest rates, a company's profit announcement, or a regulatory decision. In a non-limiting example, an activity identifier may include an assessment of the consequences and effects of the activity. For example, this can encompass a financial activities or newsworthy activities influence on the stock market, currency exchange rates, interest rates, consumer behavior, industry sectors, or the broader economy.

With continued reference to FIG. 6, processor 604 may receive structured data 612 of a football game. Structured data 612 may include one or more box scores 620 that matches with an activity condition 632, wherein the activity condition 632 may include "(a team) lead after every quarter and won by a certain margin." In this circumstance, for example, structured data 612 may then be classified as a "blowout victory." In another non-limiting example, structured data 612 regarding to a football game may include one or more box scores 620 that matches with an activity condition 632, wherein the activity condition 632 may include "(a team) was trailing after halftime but won the game." Structured data 612 may then be determined as a "come-from-behind win." In some embodiments, determining activity classification 628 may include applying a first set of activity conditions to structured data 612 and applying a second set of activity conditions to activity data, wherein the first set of activity conditions is a subset of the second set of activity conditions. In a non-limiting example, processor 604 may apply plurality of activity conditions 632 to structured data 612 from most restrictive circumstances to least restrictive circumstances; for instance, processor 604 may first check whether there is a match with circumstances of "overtime game." Processor 604 may then check whether there is a match with circumstances of "comeback win." Processor 604 may finally check whether there is a match with circumstances of "normal game." For instance, processor 604 may first check whether there is a match with circumstances of "good year-over-year growth." Processor 604 may then check whether there is a match with circumstances of "unprofitable quarter." Processor 604 may finally check whether there is a match with circumstances of "profitable quarter."

With continued reference to FIG. 6, in some embodiments, determining activity classification 628 may include a use of a rule-based engine. As used in this disclosure, a "rule-based engine" is a system that executes one or more rules in a runtime production environment. As used in this disclosure, a "rule" is a pair including a set of conditions and a set of actions, wherein each condition within the set of conditions is a representation of a fact, an antecedent, or otherwise a pattern, and each action within the set of actions is a representation of a consequent. In a non-limiting example, rule may include a condition such as, without limitation, activity condition 632 of "(a team) did not score for the whole game" pair with a consequent such as, without limitation, activity classification 628 of "huge loss." In some embodiments, rule-based engine may execute one or more rules on structured data 612 if any activity conditions 632 are met. In some embodiments, rule-based engine may include an inference engine for determine a match of activity condition 632, where any or all structured data 612 may be represented as values and/or fuzzy sets for linguistic variables measuring the same, as described in more detail in FIG. 8. Inference engine may use one or more fuzzy inferencing rules to output one or more linguistic variable values and/or defuzzified values indicating match of activity condition 632. As used in the current disclosure, a "fuzzy inference" is a method that interprets the values in the input vector (i.e., structured data 612, activity classification 628) and, based on a set of rules, assigns values to the output vector. A fuzzy set may also be used to show degree of match between fuzzy sets may be used to rank one resource against another. For instance, if both excessive structured data 612 and activity classification 628 have fuzzy sets, activity classification 628 may be determined by having a degree of overlap exceeding a predetermined threshold.

With continued reference to FIG. 6, processor 604 may determine activity classification 628 using a using a lookup table. A "lookup table," for the purposes of this disclosure, is an array of data that maps input values to output values. A lookup table may be used to replace a runtime computation with an array indexing operation. A look-up table may be configured to pre-calculate and store data in static program storage, calculated as part of a program's initialization phase, or even stored in hardware in application-specific platforms. In another non limiting example, an activity classification lookup table may be able to correlate structured data 612 to an activity condition 632, and further correlate the activity condition 632 to an activity classification 628. Processor 604 may be configured to "lookup" structured data 612 and/or activity condition 632 in order to find a corresponding activity condition 632 and/or activity classification 628. Storing data within lookup table may allow for quick recall of data by processor 604. Data within the lookup table may include previous examples of plurality of activity classifications 628 compared to structured data 612 and/or activity condition 632. Data within the lookup table may be received from a database. Lookup tables may also be used to identify activity classifications 628 by matching an input value to an output value by matching the input against a list of valid (or invalid) items in an array.

With continued reference to FIG. 6, in some embodiments, processor 604 may be configured to determine activity classification 628 using a machine-learning model, such as a classifier. In some embodiments, the machine-learning model may be generated using a machine-learning module as described throughout this disclosure. In some embodiments, machine-learning model may be trained using categorization training data comprising exemplary structured data correlated to activity classifications. In some embodiments, the categorization training data may include exemplary articles correlated to activity classifications. In some embodiments, the structured data and/or exemplary articles in classification training data may be automatically retrieved from scaping the internet. This may allow for the acquisition of large sets of training data relatively cheaply. In some embodiments, the machine-learning model for determining an activity classification may include a clustering model. The machine-learning model may be consistent with any machine-learning model disclosed in this disclosure.

With continued reference to FIG. 6, in some embodiments, determining activity classification 628 may include training an classification machine-learning process 636. A "machine-learning process," as used in this disclosure, is a process that automatedly uses a body of data known as training data and/or a training set (described further below in this disclosure) to generate an algorithm that will be performed by processor 604 to produce outputs given data provided as inputs; this is in contrast to a non-machine learning software program where the commands to be executed are determined in advance by a user and written in a programming language. Classification machine-learning process 636 may utilize supervised, unsupervised, lazy-learning processes and/or neural networks, described further below. Classification machine-learning process 636 may be trained using classification training data 640, wherein the classification training data 640 may include a plurality of structured data 612 as input correlated to a plurality of activity classifications 628. In an embodiment, classification training data 640 may be obtained from activity data source 616 described above. In another embodiments, classification training data 640 may include manually labeled data. As a non-limiting example, structured data 612 may be manually collected and labeled by the user and/or a professional such as, without limitation, player, activity organizer, anyone who participates in the activity, and the like thereof. Processor 604 may then determine activity classification 628 as a function of trained classification machine-learning process 636. In some embodiments, classification machine-learning process 636 may be used to determine activity classification 628 based on input containing structured data 612; this may be performed using, without limitation, classification. In some cases, classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 6, as used in this disclosure, a "classifier" is a machine-learning model, such as a mathematical model, neural net, or program generated by a machine learning algorithm known as a "classification algorithm," as described in further detail below, that sort inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Processor 604 and/or another device may generate a classifier using a classification algorithm, defined as a process whereby a processor 604 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 6, in some embodiments, processor 604 may be configured to generate machine learning model such as, without limitation, classification machine-learning process 636, using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)+P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Processor 604 may then calculate a likelihood table by calculating probabilities of different data entries and classification labels. Processor 604 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 6, in some embodiments, processor 604 may be configured to generate machine learning model such as, without limitation, classification machine-learning process 636, using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 6, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 60, 65] may be treated as equivalent, for purposes of this disclosure, as a vector represented as [6, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm, where $a_i$ is attribute number experience of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 6, processor 604 is further configured to select a plurality of tokens 644 as a function of the activity classification 628. As used in this disclosure, a "token" is a linguistic segment or theme associated with the activity. In a non-limiting example, tokens 644 may include words, phrases, sentences, themes, keyword, and the like. In some cases, tokens 644 may be tagged to correspond with different activity classifications 628. For example, a plurality of tokens 644 may describe keywords for financial activity. Keywords may be interest rates, depression, housing market, federal reserve. In another example, a plurality of tokens may describe themes associated with a political activity. Themes may be presidential election, democratic, republican, presidential debate, and the like. In other cases, tokens may be tagged to correspond with multiple activity classifications 628. In another non-limiting example, a token may include one or more themes associated with the activity. Themes may include tone (formal, informal, journalistic, scholarly, etc.), persuasiveness, fact based, opinion, and the like. In a non-limiting example, plurality of tokens 644 may include a first token corresponding to a first activity classification and a second token corresponds to a second activity classification. For instance, first token "got out to an early lead" may correspond to first activity classification "blowout victory." Second token "follow closely behind" may correspond to second activity classification "close game." More exciting adjectives and adverbs may be tagged with more exciting activity classifications 628. In some embodiments, selecting plurality of tokens 644 may include selecting one or more tokens corresponding to determined activity classification 628 described above. Additionally, or alternatively, plurality of tokens 644 may be stored and/or retrieved from database described above in reference to structured data source 616. In a non-limiting example, selecting plurality of tokens 644 may include selecting plurality of tokens from a bank of content, wherein the bank of content may include a plurality of linguistic data. Bank of content may be stored in a database as described above.

With continued reference to FIG. 6, processor 604 is further configured to generate an structured data report 648 as a function of plurality of tokens 644. As used in this disclosure, "structured data report" is a report that is generated from a structured data source. In some embodiments, structured data report 648 may include an activity report. As used in this disclosure, an "activity report" is a report describing various aspects of an activity. An activity report may include a document that provides a comprehensive summary of the activities, tasks, and/or accomplishments of an individual, team, department, or organization over a specific period of time. For example, an activity may include, without limitation, a sporting event, financial event, political event, newsworthy event, and the like as described above. Structured data report 648 may be used for internal communication and management purposes to track progress, assess performance, and make informed decisions. For instance, and without limitation, structured data report 648 may include, for example and without limitation, a financial report, such as an investor report for a company. In some cases, the format of the activity report may be journalistic. In some cases, structured data report 648 may be in a newspaper, magazine, any other publications, and the like thereof. In some embodiments, generating structured data report 648 may include comparing confidence score 624 to a confidence threshold and generating structured data report 648 as a function of the comparison of confidence score 624 and the confidence threshold. As used in this disclosure, a "confidence threshold" is a confidence score magnitude that must be exceeded for certain condition to occur or be manifested. In a non-limiting example, structured data report 648 may be generated by processor 604 if, and only if confidence score 624 of activity data 612 exceeds confidence threshold. In another non-limiting example, structured data report 648 may not be generated by processor 604 if confidence score 624 is missing or is below a confidence threshold.

With continued reference to FIG. 6, in some embodiments, structured data report 648 may be generated using an LLM as described in this disclosure above. The LLM may be trained using various news reports, police reports, memos, notes, and the like. Inputs into the LLM may include the plurality of tokens 644 and the activity classifications 628. Whereas the output of the LLM may be a structured data report 648. Training data for the LLM may include the plurality of tokens 644 and the activity classifications 628 as inputs correlated to examples of activity reports 648. In some embodiments, LLM may receive structured data 612 as input and may output structured data report 648. In some embodiments, LLM may receive structured data 612 and one or more user prompts as input and may output structured data report 648. LLM, as described with respect to FIG. 6, may be trained on a diverse dataset comprising a variety of different textual documents. In some embodiments, LLM may be trained on a specific set of textual documents, corresponding to a type of structured data report 648 and/or final report 650 that it is configured to produce. For example, LLM may be trained using sets of financial reports, sports articles, weather reports, management reports, economic reports, and the like, such that it is specifically trained to produce a particular type of structured data report 648 and/or final report 650. This may allow for more fine-tuned output from LLM because LLMs are conventionally trained on large datasets containing a wide variety of different documents. My choosing a specific set of training data, LLM may be tailored to better produce specific types of structured data reports 648 and/or final reports 650. In an embodiment, training data may include a plurality of tokens 644 and a plurality of activity classifications 628 correlated to examples of activity reports 648.

With continued reference to FIG. 6, processor 604 may generate a final report 150 as a function of the structured data report 648 or article. As used in the current disclosure, a "final report" is an structured data report 648 that has been placed through a finalization process. As used in the current disclosure, a "finalization process" refers to a structured set of steps designed to enhance the quality and accuracy of the activity report or article. A finalization process may be configured to analyze the structured data report 648 and correct imperfections or inaccuracies in the structured data report 648. This process involves careful analysis and correction of any imperfections or inaccuracies present in the content. The objective is to refine the report so that it provides a clear and precise representation of the activity being described. One purpose for generating a final report 150 may be to ensure that the content of the structured data report 648 are free from inaccuracies and over exaggerations.

With continued reference to FIG. 6, in some embodiments, final report 150 may be generated using a LLM as disclosed throughout the entirety of this disclosure. As a non-limiting example, an LLM may receive structured data report 148 as input and may output a final report. In some embodiments, LLM may receive structured data report 148 and a user prompt, and may output a final report. User prompt may include any additional instructions that a user has for the LLM. In some embodiments, user prompt may include "write this at an 8th grade reading level," "write this in the style of a sports reporter," "write this in the style of the New Yorker," and the like. Allowing the LLM to generate a final report 150 from structured data report 648, allows for the elimination or reduction of factual inaccuracies that are commonplace in the output of LLMs. Allowing the LLM to work from a pre-generated structured data report 648 may prevent the LLM from perpetuating factual inaccuracies or errors that may be found in its training data or generated by the LLM. For example, feeding the LLM the structured data report 648 may allow it to use the facts and logic present in structured data report 648 instead of generating its own. This would allow a user to take advantage of the unprecedented flexibility afforded by LLMs, such as the ability to quickly generate articles in different styles, formats, and voices, while retaining control over the accuracy and reliability of the content within final report 150.

With continued reference to FIG. 6, a finalization process for an activity report may include a series of steps and considerations taken to complete and prepare the report for distribution, presentation, or archival. This process ensures that the report is accurate, well-organized, and effectively communicates the information related to the described activity. The finalization process may include a thorough review of the content within the activity report by processor 604. This includes checking that all relevant information has been included, accurate data has been provided, and any objectives or outcomes of the activity have been adequately addressed. Structured data report 648 may include statistical or numerical data based on one or more facts surrounding the activity. To ensure accuracy of this data processor 604 may be configured to cross reference the data with the original sources or verifying calculations.

With continued reference to FIG. 6, in some embodiments, generating structured data report 648 may include arranging plurality of tokens 644 as a function of activity classification 628 In some embodiments, arranging plurality of tokens 644 may include placing plurality of tokens 644 into structured data report 648. In a non-limiting example, processor 604 may be configured to generate an structured data report 648 of an activity according to an activity classification 628 of the activity. For example, structured data report 648 may include "x, y, z." Plurality of tokens may include a first set of tokens, a second set of tokens, and a third set of tokens, wherein the first set of tokens may include tokens describe the beginning of activity, wherein the second set of tokens may include tokens describe the activity in progress, and wherein the third set of tokens may include tokens describe the end of activity. Processor 604 may then replace x in structured data report 648 with first set of tokens, y with second set of tokens, and z with third set of tokens. In another non-limiting example, processor 604 may be configured to generate an structured data report 648 of a sporting event with an activity classification 628: "overtime thriller." Generating structured data report 648 may first start by selecting a first set of tokens from plurality of tokens 644 and placing the first set of tokens at beginning of structured data report 648, wherein first set of tokens may include tokens describe the overtime portion of the sporting event. Processor 604 may then select a second set of tokens from plurality of tokens 644 and place the second set of tokens after first set of tokens, wherein second set of tokens may include tokens describe beginning to end of the game. In other non-limiting example, processor 604 may be configured to generate an structured data report 648 of a sporting event with an activity classification 628: "blowout victory." Generating structured data report 648 may include arranging one or more set of tokens selected from plurality of tokens 644 chronologically; for instance, arranging one or more set of tokens from first portion of sporting event to last portion of sporting event.

With continued reference to FIG. 6, structured data report 648 and/or final report 650 may include an report link 652 and/or boilerplate data 656. As used in this disclosure, an "report link" is an element within a report, such as structured data report 648 or final report 650, that contains a relationship between that report and one or more other objects. In some embodiments, report link 652 may include a hyperlink. As used in this disclosure, a "hyperlink" is a digital reference to data such as, without limitation, structured data report 648. In some cases, hyperlink may be interaction component described in further detail below. In some embodiments, generating structured data report 648 may include generating an report link 652, wherein generating the activity link 652 may include tagging report with a report tag. As used in this disclosure, an "report tag" is an identifier used to group and/or identify a group of similar activity reports. In some cases, activity reports may be similar when content such as, without limitation, team, player, activity time, and the like are same. In other cases, reports may be similar when activity classifications 628 are identical. Report may include a plurality of report tags. In a non-limiting example, two reports may include contents reporting a same team. Processor 604 may be configured to tag both reports with team name as report tag. Generating report link may further include identifying a previous report as a function of report tag. As used in this disclosure, a "previous report" is an report generated and/or published before. Previous report may be generated using processing steps described in this disclosure. In some embodiments, previous report may include an report concerning one or more aspects of a previous activity related to the current activity. In some embodiments, structured data report 648 and/or previous report may be stored in database described above. In some cases, storing structured data report 648 and/or previous report may include storing them based on their report tag. This may allow for related reports to be quickly located, so that they may be linked to in a structured data report 648. This improves the technology of automated report or article generation by allowing for links to other media to be intelligently and quickly incorporated into the article. In some embodiments, processor 104 may publish structured data report 648 and/or final report 150 using a content management system (CMS). In some embodiments, after the structured data report 648 and/or final report 150 is published, processor 104 may receive a unique identifier tied to the report. In some embodiments, processor 104 may store that unique identifier and report tags for the report in a database. In some embodiments, processor 104 may store that unique identifier and report tags for the report in a lookup table. Processor may retrieve the unique identifier from the database and lookup table as a function of the report tags and generate a link to the report using the unique identifier. In a non-limiting example, database may include a first table storing a first collection of reports and a second table storing a second collection of reports, wherein each report of the first collection of reports may be tagged with a first report tag and each report of the second collection of reports may be tagged with a second report tag, and wherein the first report tag is different from the second report tag. In some embodiments, previous reports may be selected from database containing at least one report with at least one identical report tag. Generating report link 652 may further include generating the report link as a function of previous report. Generating report link 652 may include using any processing step described in this disclosure. In a non-limiting example, generating report link 652 may include selecting one or more tokens 644 from previous reports and generating report link 652 by rearranging tokens 644. In another non-limiting example, generating report link 652 may include summarizing previous report into a sentence using language processing module described in further detail below. Further, generating structured data report 648 may further include inserting generated report link 652 into the structured data report 648. In a non-limiting example, structured data report 648 may include one or more report links 652 that link to one or more articles that concerns teams or players' last games, or previous matchups between these teams and/or players. In a non-limiting example, report links 652 may be embedded within a plurality of tokens 644 of structured data report 648, wherein report links 652 may include previous reports of the same report tag with structured data report 648. Inserting report link 652 may include inserting report link 652 into structured data report 648 at different position.

With continued reference to FIG. 6, in some embodiments, report link 652 may include an interaction component. As used in this disclosure, an "interaction component" is an element that is interactable. In a non-limiting example, users (i.e., readers) may interact with structured data report 648 through interaction component. In some cases, interaction component, may include, without limitation, button, link, image, video, audio, and the like thereof. In some embodiments, interaction component may include an event handler. As used in this disclosure, an "event handler" is an element that operates asynchronously once an event take place. In some cases, event handler may include routine, wherein the routine is a sequence of code that is intended to be called and executed repeatedly when apparatus 600 is running. In a non-limiting example, event handler may include a callback routine, wherein the callback routine may dictate one or more action that follows event. As used in this disclosure, an "event" is an action that take place when the user interacts with apparatus 600, structured data report 648, interaction component, and/or any other components/devices that user may interact with. For example, event may include, without limitation, clicking, holding, pressing, tapping, swiping and the like thereof. In some cases, event may include a combination of a plurality of actions. In other cases, event may involve other interactive devices such as, without limitation, mouse, keyboard, display, headphone, any other interactive device that is either electrically and/or communicatively connected to apparatus 600, and the like thereof. In some embodiments, event handler may utilize one or more application program interface (API) such as, without limitation, web events and the like thereof. Event handler may operate any processing step described in this disclosure. In a non-limiting example, user may be able to read previous activity report by interact with interaction component within report link 652. User may click on interaction component and its corresponding event handler may direct user to previous activity report by open a uniform resource locator (URL) in a new tab of current window containing previous activity report.

With continued reference to FIG. 6, as used in this disclosure, "boilerplate data" is data regarding to standardized text of structured data report 648 that can be used repeatedly without making major changes. In some cases, boilerplate data 656 may be selected by the user. In a non-limiting example, boilerplate data 656 may be received from a client. In a non-limiting example, user may be able to customize boilerplate data 656 by editing text within boilerplate data 656. In some embodiments, boilerplate data 656 may include, without limitation, an AI disclaimer, links to a membership service, links to a homepage, and the like thereof. In some cases, boilerplate data 656 may be placed at the end of structured data report 648. In a non-limiting example, generating structured data report 648 may include inserting a boilerplate data 656 after plurality of tokens 644. In some embodiments, boilerplate data 656 may include a signature of the user (i.e., author or individual who generates structured data report 648) and/or a copyright notice or other legal notice.

With continued reference to FIG. 6, processor 604 may generate structured data report 648 using a report machine-learning model. As used in the current disclosure, a "report machine-learning model" is a machine-learning model that is configured to generate structured data report 648. report machine-learning model may be consistent with the machine-learning model described above in FIG. 2. Inputs to the report machine-learning model may include activity data 612, box score 620, confidence score 624, activity data source 616, activity conditions 632, activity training data 640, token 644, examples of structured data report 648, and the like. Outputs to the report machine-learning model may include structured data report 648 tailored to the activity data 612. Report training data may include a plurality of data entries containing a plurality of inputs that are correlated to a plurality of outputs for training a processor by a machine-learning process. In an embodiment, report training data may include a plurality of activity classifications 628 and tokens 644 correlated to examples of activity reports 648. Report training data may be received from a database. Report training data may contain information about activity data 612, box score 620, confidence score 624, activity data source 616, activity conditions 632, activity training data 640, token 644, examples of structured data report 648, and the like. In an embodiment, report training data may be iteratively updated as a function of the input and output results of past report machine-learning model or any other machine-learning model mentioned throughout this disclosure. The report machine learning model may include a Language processing module 660 or a LLM as described herein above in FIG. 1. The machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning model, and the like.

With continued reference to FIG. 6, in some embodiments, generating the activity report may include generating the activity report using a Language processing module 660660. Language processing module 660 may include any hardware and/or software module. Language processing module 660 may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. Tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

With continued reference to FIG. 6, Language processing module 660 may operate to produce a language processing model. Language processing model may include a program automatically generated by computing device and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

With continued reference to FIG. 6, Language processing module 660 and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs has used herein are statistical models with inference algorithms that that may be applied to the models. In such models, a hidden state to be estimated may include an association between an extracted word, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module 660 may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

With continued reference to FIG. 6, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

With continued reference to FIG. 6, Language processing module 660 may use a corpus of documents to generate associations between language elements in a Language processing module 660, and diagnostic engine may then use such associations to analyze words extracted from one or more documents and determine that the one or more documents indicate significance of a category. In an embodiment, Language processing module 660 and/or processor 604 may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into processor 604. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

With continued reference to FIG. 6, in some embodiments, Language processing module 660 may include a grammatical checker. As used in this disclosure, a "grammatical checker" is a component of language processing module that attempts to verify text (i.e., tokens 644) for grammatical correctness. In a non-limiting example, grammatical checker may include a program that runs simultaneously in the background of the runtime environment of language processing module while generating structured data report 648. Grammatical checker may automatically correct structured data report 648 during, or after structured data report 648 generation. Correcting structured data report 648 may include, without limitation, grammar, spelling, tense, word choice, and the like thereof.

With continued reference to FIG. 6, additionally, or alternatively, generating structured data report 648 may include exporting structured data report 648. As used in this disclosure, "exporting" is converting, outputting, or otherwise exporting structured data report 648 using processor 604. In some embodiments, exporting structured data report 648 may include converting structured data report 648 into any data structure described in this disclosure. In some embodiments, exporting structured data report 648 may include outputting activity report in a format such as, without limitation, an HTML file, pdf file, text document, word document, and the like thereof. In a non-limiting example, processor 604 may convert text within structured data report 648 into one or more HTML tags using a representational state transfer (REST) API, wherein the REST API is an API that conforms to constraints of REST architectural style (i.e., client-server architecture). User (i.e., client) may initiate conversion of structured data report 648 by requesting server through REST API. Requesting server may include client sending a request such as, without limitation, a POST request and the like. Server may post converted one or more HTML tags to a customer relationship management (CRM) platform, wherein the CRM platform is a system that administer a business or other organization interactions with users through data analysis. CRM platform may include a back-office system containing a plurality of automated processes that is executable by processor 604. CRM platform may send a unique identifier of exported structured data report 648, a HTML file containing one or more converted HTML tags, and a URL to exported structured data report 648 through an email. Unique identifier and/or URL to exported structured data report 648 may include report link 652 described above in this disclosure.

Figure 7:
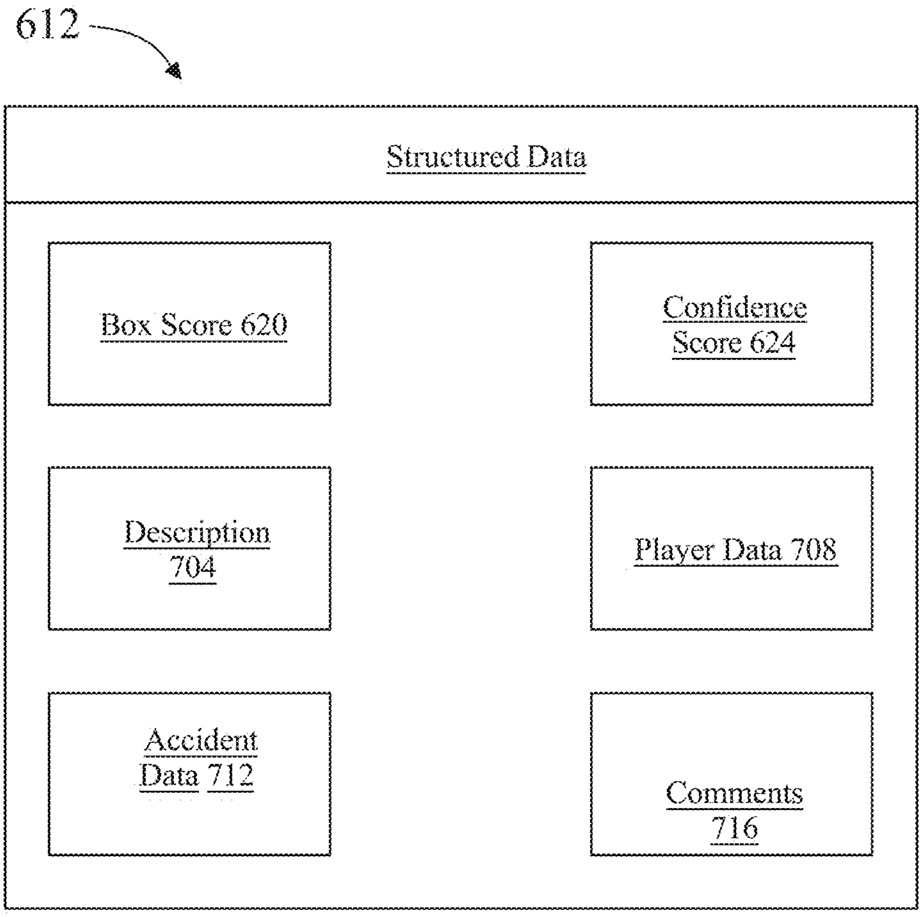
FIG. 7 is a block diagram of an exemplary embodiment of activity data.

Referring now to FIG. 7, a block diagram of an exemplary embodiment of structured data 612 is illustrated. Structured data 612 may include any activity data described in this disclosure. In some embodiments, without limitation, structured data 612 may include box score 620 described above in this disclosure. In some embodiments, without limitation, structured data 612 may include confidence score 624 described above in this disclosure. In some embodiments, without limitation, structured data 612 may include a description 704, wherein the description 704 is detailed information related to the structured data. In some cases, description 704 may include, without limitation, rules, a schedule, historical information, location data, and the like. In a non-limiting example, description 704 may specify a location and a time of where an activity is took place. In some embodiments, without limitation, structured data 612 may include player data 708, wherein the player data 708 is data related to activity participants (i.e., players). In some cases, player data 708 may include, without limitation, player name, team name, player age, years of playing, accomplishments, player statistics, and the like thereof. In a non-limiting example, player data 708 may include a match history of a player and the player's team along with a win rate. In some embodiments, without limitation, structured data 612 may include an accident data 712, wherein the accident data 712 is data related to unexpected or unintentional events. In some cases, accident data 712 may include, without limitation, weather, injuries, unfortunate incidents and the like. In a non-limiting example, accident data 712 may include a reason for an activity or event cancellation. In some embodiments, without limitation, structured data 612 may include activity comments 616, wherein comments 716 is data related to spectators' opinions or reaction to the activity. In some cases, comments 716 may include, without limitation, spectators' view, explainers' words, online reviews, and the like thereof. In a non-limiting example, comments 716 may include a collection of online comments on an event. Additionally, or alternatively, structured data 612 may be stored in and/or retrieved from activity data source 616 as described above in reference to FIG. 6.

Figure 8:
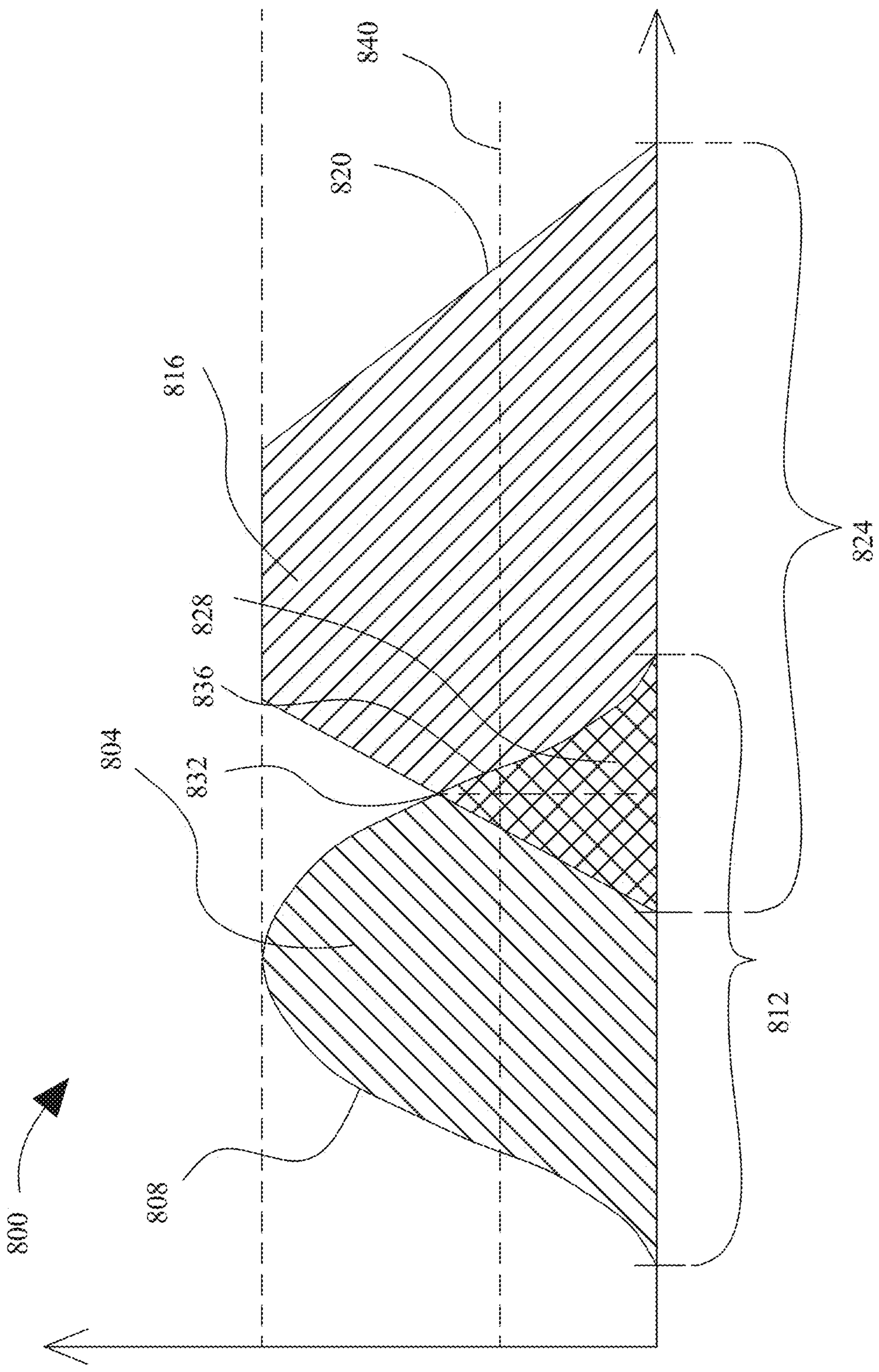
FIG. 8 is a schematic diagram illustrating an exemplary embodiment of a fuzzy inferencing system.

Referring to FIG. 8, an exemplary embodiment of fuzzy set comparison 800 is illustrated. A first fuzzy set 804 may be represented, without limitation, according to a first membership function 808 representing a probability that an input falling on a first range of values 812 is a member of the first fuzzy set 804, where the first membership function 808 has values on a range of probabilities such as without limitation the interval [0,1], and an area beneath the first membership function 808 may represent a set of values within first fuzzy set 804. Although first range of values 812 is illustrated for clarity in this exemplary depiction as a range on a single number line or axis, first range of values 812 may be defined on two or more dimensions, representing, for instance, a Cartesian product between a plurality of ranges, curves, axes, spaces, dimensions, or the like. First membership function 808 may include any suitable function mapping first range 812 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } c < a \\ \frac{x-a}{b-a}, \text{ for } a \le x < b \\ \frac{c-x}{c-b}, \text{ if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 8, first fuzzy set 804 may represent any value or combination of values as described above, including output from one or more machine-learning models, activity data, and a predetermined class, such as without limitation of activity classification and the like. A second fuzzy set 816, which may represent any value which may be represented by first fuzzy set 804, may be defined by a second membership function 820 on a second range 824; second range 824 may be identical and/or overlap with first range 812 and/or may be combined with first range via Cartesian product or the like to generate a mapping permitting evaluation overlap of first fuzzy set 804 and second fuzzy set 816. Where first fuzzy set 804 and second fuzzy set 816 have a region 828 that overlaps, first membership function 808 and second membership function 820 may intersect at a point 832 representing a probability, as defined on probability interval, of a match between first fuzzy set 804 and second fuzzy set 816. Alternatively, or additionally, a single value of first and/or second fuzzy set may be located at a locus 836 on first range 812 and/or second range 824, where a probability of membership may be taken by evaluation of first membership function 808 and/or second membership function 820 at that range point. A probability at 828 and/or 832 may be compared to a threshold 840 to determine whether a positive match is indicated. Threshold 840 may, in a non-limiting example, represent a degree of match between first fuzzy set 804 and second fuzzy set 816, and/or single values therein with each other or with either set, which is sufficient for purposes of the matching process; for instance, threshold may indicate a sufficient degree of overlap between an output from one or more machine-learning models and/or activity data and a predetermined class, such as without limitation activity classification categorization, for combination to occur as described above. Alternatively, or additionally, each threshold may be tuned by a machine-learning and/or statistical process, for instance and without limitation as described in further detail below.

Further referring to FIG. 8, in an embodiment, a degree of match between fuzzy sets may be used to classify activity data with activity classification. For instance, if an activity classification has a fuzzy set matching activity data fuzzy set by having a degree of overlap exceeding a threshold, processor 104 may classify the activity data as belonging to the activity classification categorization. Where multiple fuzzy matches are performed, degrees of match for each respective fuzzy set may be computed and aggregated through, for instance, addition, averaging, or the like, to determine an overall degree of match.

Still referring to FIG. 8, in an embodiment, activity data may be compared to multiple activity classification categorization fuzzy sets. For instance, activity data may be represented by a fuzzy set that is compared to each of the multiple activity classification categorization fuzzy sets; and a degree of overlap exceeding a threshold between the activity data fuzzy set and any of the multiple activity classification categorization fuzzy sets may cause processor 104 to classify the activity data as belonging to activity classification categorization. For instance, in one embodiment there may be two activity classification categorization fuzzy sets, representing respectively a first activity classification categorization and a second activity classification categorization. First activity classification categorization may have a first fuzzy set; Second activity classification categorization may have a second fuzzy set; and activity data may have activity data fuzzy set. Processor 104, for example, may compare activity data fuzzy set with each of first activity classification categorization fuzzy set and second activity classification categorization fuzzy set, as described above, and classify an activity data to either, both, or neither of first activity classification categorization nor second activity classification categorization. Machine-learning methods as described throughout may, in a non-limiting example, generate coefficients used in fuzzy set equations as described above, such as without limitation x, c, and a of a Gaussian set as described above, as outputs of machine-learning methods. Likewise, activity data may be used indirectly to determine a fuzzy set, as activity data fuzzy set may be derived from outputs of one or more machine-learning models that take the activity data directly or indirectly as inputs.

Still referring to FIG. 8, a computing device may use a logic comparison program, such as, but not limited to, a fuzzy logic model to determine an activity classification response. An activity classification response may include, but is not limited to, flat, exciting, gripping, unforgettable and the like; each such activity classification response may be represented as a value for a linguistic variable representing activity classification response or in other words a fuzzy set as described above that corresponds to a degree of match of activity classification as calculated using any statistical, machine-learning, or other method that may occur to a person skilled in the art upon reviewing the entirety of this disclosure. In other words, a given element of activity data may have a first non-zero value for membership in a first linguistic variable value and a second non-zero value for membership in a second linguistic variable value. In some embodiments, determining an activity classification categorization may include using a linear regression model. A linear regression model may include a machine learning model. A linear regression model may be configured to map data of activity data, such as degree of compatibility to one or more activity classification parameters. A linear regression model may be trained using a machine learning process. A linear regression model may map statistics such as, but not limited to, quality of activity data to activity classification. In some embodiments, determining an activity classification of activity data may include using an activity classification model. An activity classification model may be configured to input collected data and cluster data to a centroid based on, but not limited to, frequency of appearance, linguistic indicators of quality, and the like. Centroids may include scores assigned to them such that quality of compatibility of activity data may each be assigned a score. In some embodiments activity classification model may include a K-means clustering model. In some embodiments, activity classification model may include a particle swarm optimization model. In some embodiments, determining the activity classification of activity data may include using a fuzzy inference engine. A fuzzy inference engine may be configured to map one or more activity data elements using fuzzy logic. In some embodiments, activity data may be arranged by a logic comparison program into activity classification arrangement. An "activity classification arrangement" as used in this disclosure is any grouping of objects and/or data based on skill level and/or output score. This step may be implemented as described above in FIGS. 1-4. Membership function coefficients and/or constants as described above may be tuned according to classification and/or clustering algorithms. For instance, and without limitation, a clustering algorithm may determine a Gaussian or other distribution of questions about a centroid corresponding to a given level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 8, an inference engine may be implemented according to input and/or output membership functions and/or linguistic variables. For instance, a first linguistic variable may represent a first measurable value pertaining to activity data, such as a degree of match of activity classification of an element, while a second membership function may indicate a degree of in activity classification of a subject thereof, or another measurable value pertaining to activity data. Continuing the example, an output linguistic variable may represent, without limitation, a score value. An inference engine may combine rules, such as: "if the activity is 'football" and the score difference is 'high', the activity classification is "huge win"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively, or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively, or additionally, output rules may be replaced with functions according to the Takagi-Sugeno-King (TSK) fuzzy model.

Figure 9:
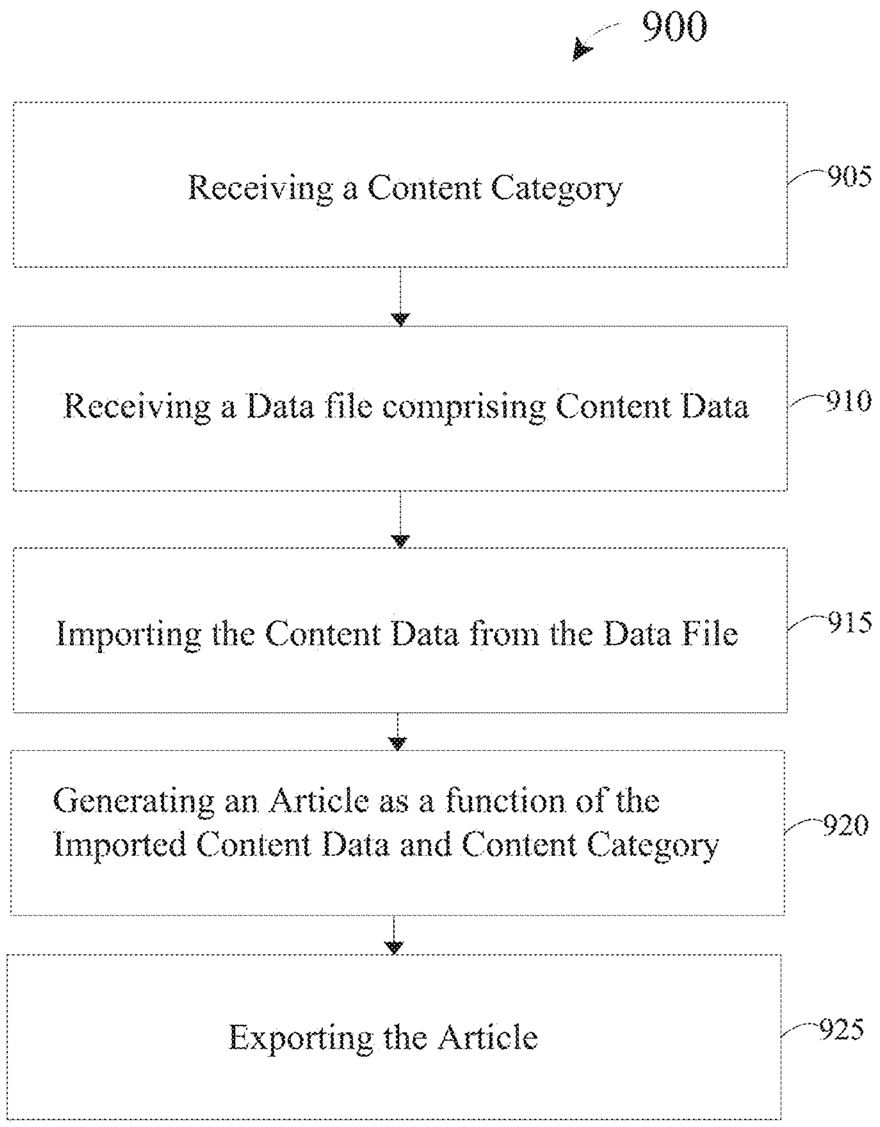
FIG. 9 is a flow diagram of an exemplary method for generating an article.

Referring now to FIG. 9, a flow diagram of exemplary method 900 for generating an article. At step 905, method 900 includes receiving, by a computing device, a content category. This may be implemented as disclosed and with reference to FIGS. 1-5. In some embodiments, the content category comprises a type of article received from a user selection. The content data comprises contextual information. At step 910, method 900 includes receiving, by the computing device, a data file comprising content data. This may be implemented as disclosed and with reference to FIGS. 1-5. The data file may include a plurality of headers related to a plurality of data types. At step 915, method 900 includes importing, by the computing device, the content data from the data file. This may be implemented as disclosed and with reference to FIGS. 1-5. Importing the content data from the data file may include classifying a plurality of desired data of the content data to a plurality of desired headers. Classifying the plurality of desired data may include receiving desired content training data correlating the data file to data files with headers matched to desired data; training a matching machine learning model as a function of the desired content training data; and; outputting the classified a plurality of desired headers to desired data of the content data. At step 920, method 900 includes generating, by the computing device, an article as a function of the imported content data and content category. This may be implemented as disclosed and with reference to FIGS. 1-5. Generating the article may include generating an aggregate article. Generating the article may include inputting the article into a neural network to receive an augmented article. At step 925, method 900 includes exporting, by the computing device, the article. This may be implemented as disclosed and with reference to FIGS. 1-5. Exporting the article may include inputting the article into an API.

Figure 10:
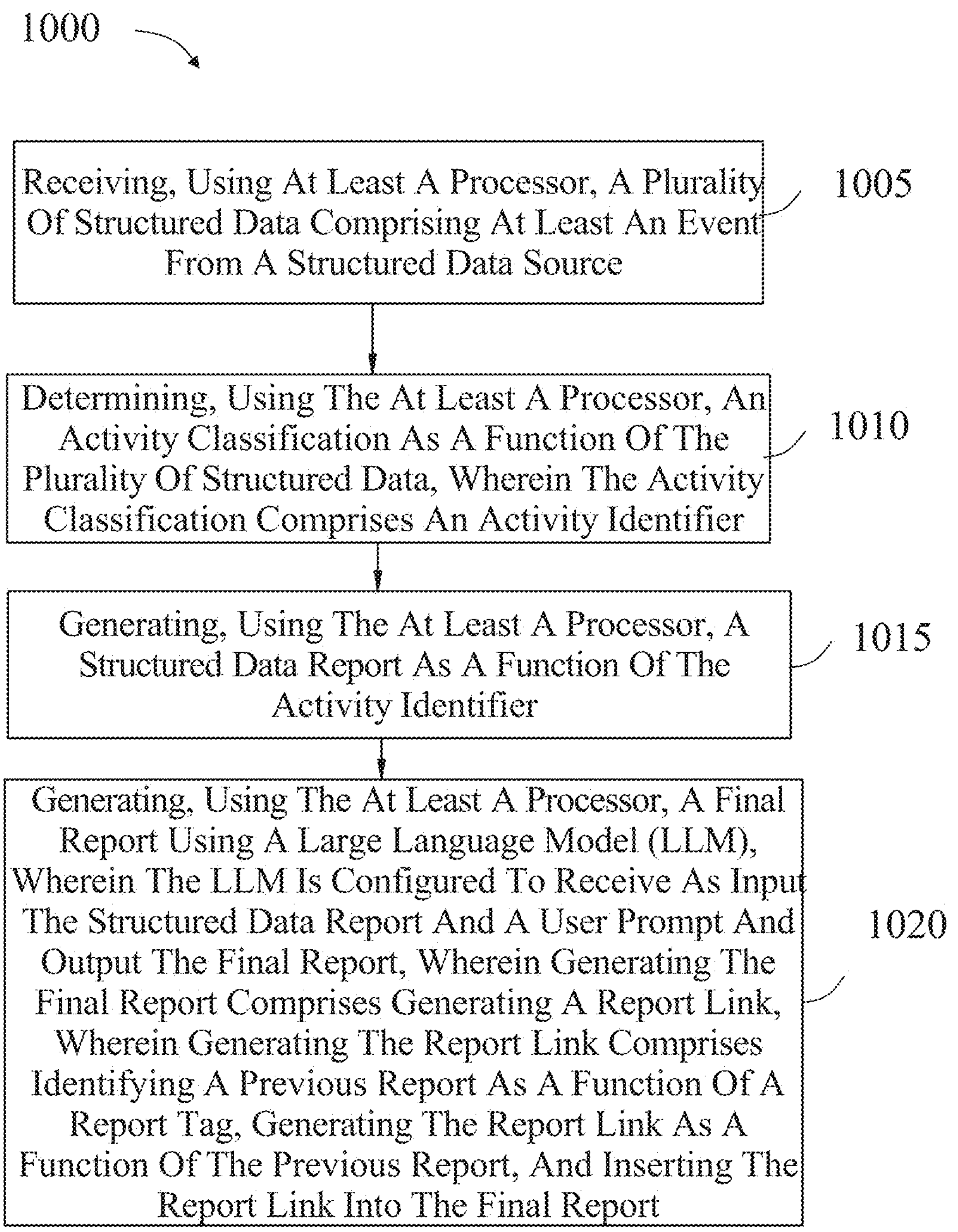
FIG. 10 is a flow diagram of an exemplary method for generating a report.

Referring now to FIG. 10, an exemplary method 1000 of generating a report is illustrated. Method 1000 includes step 1005 of receiving, using at least a processor, a plurality of structured data comprising at least an event from a structured data source. In some embodiments, receiving the plurality of structured data from the structured data source may include performing optical character recognition on the plurality of structured data to convert the plurality of structured data to machine-encoded text. This may be implemented as disclosed with respect to FIGS. 1-9.

With continued reference to FIG. 10, method 1000 includes a step 1010 of determining, using the at least a processor, an activity classification as a function of the plurality of structured data, wherein the activity classification comprises an activity identifier. In some embodiments, determining the activity classification may include iteratively applying a plurality of activity conditions to the activity data, wherein the plurality of activity conditions are applied from most strict to least strict until one of the plurality of activity conditions is satisfied. In some embodiments, determining the activity classification may include determining the activity classification using a rule-based engine.

With continued reference to FIG. 10, method 1000 includes a step 1015 of generating, using the at least a processor, a structured data report as a function of the activity identifier. This may be implemented as disclosed with respect to FIGS. 1-9.

With continued reference to FIG. 10, method 1000 includes a step 1020 of generating, using the at least a processor, a final report using a large language model (LLM), wherein the LLM is configured to receive as input the structured data report and a user prompt and output the final report, wherein generating the final report comprises generating a report link, wherein generating the report link comprises identifying a previous report as a function of a report tag, generating the report link as a function of the previous report, and inserting the report link into the final report. In some embodiments, generating the final report may include inserting at least one report link into the final report. In some embodiments, generating the final report may include tagging the report with a report tag. In some embodiments, generating the final report may include identifying a previous report as a function of the report tag. In some embodiments, generating the final report may include generating the report link as a function of the previous report. In some embodiments, generating the final report inserting the report link into the final article. In some embodiments, identifying the previous report as a function of the report tag comprises locating a unique identifier associated with the previous report in a lookup table using the report tag. This may be implemented as disclosed with respect to FIGS. 1-9.

With continued reference to FIG. 10, method 1000 may include a step of publishing, by the least a processor, the final report. Publishing the final report may include publishing the final report using a content management system (CMS). Publishing the final report may include receiving, from the CMS, a unique identifier associated with the final report. This may be implemented as disclosed with respect to FIGS. 1-9.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 11:
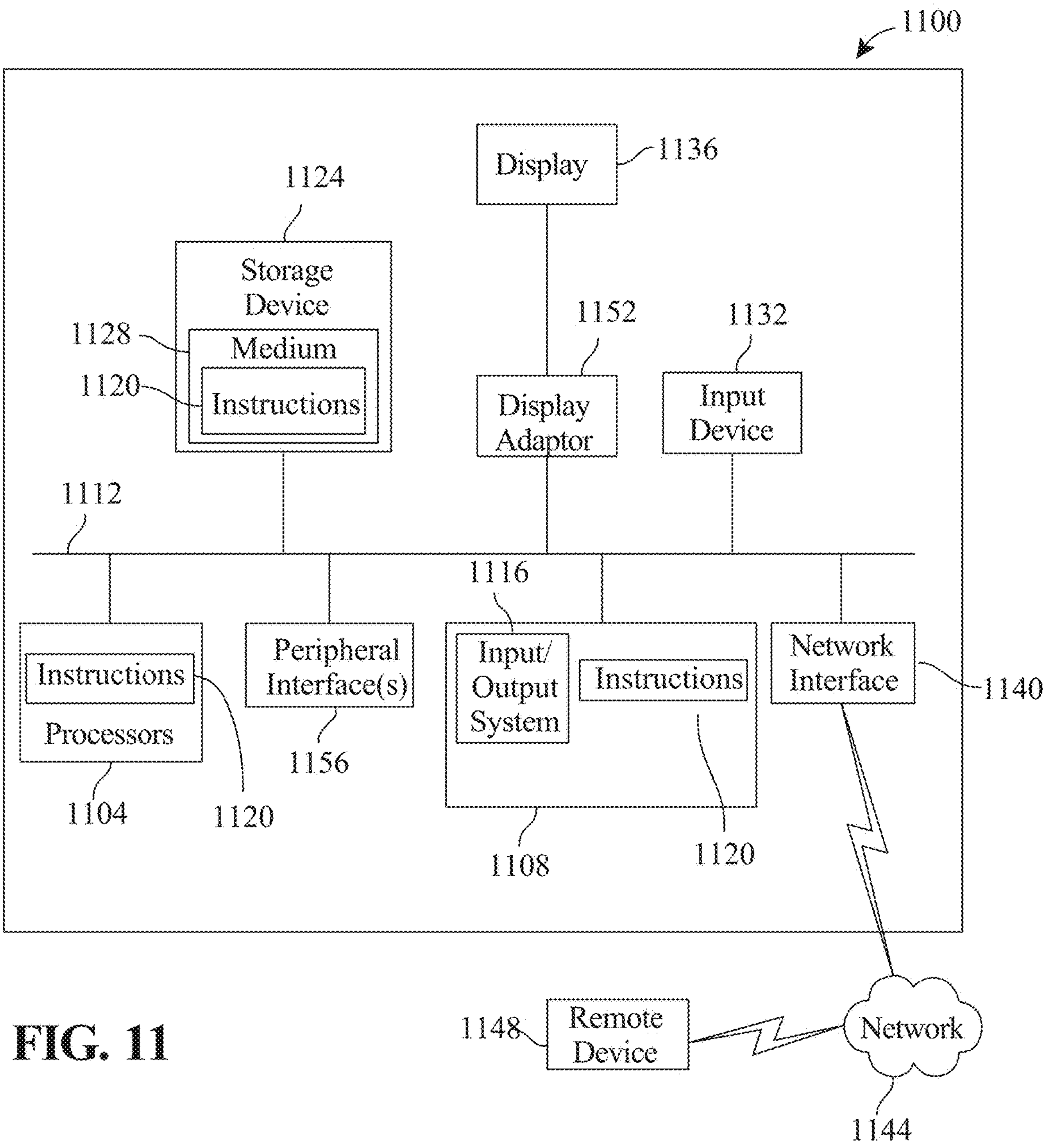
FIG. 11 is a block diagram of a computing system that can be used to implement any one or more of the methodologies disclosed herein and any one or more portions thereof.

FIG. 11 shows a diagrammatic representation of one embodiment of a computing device in the exemplary form of a computer system 1100 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Processor 1104 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1104 may be organized according to Von Neumann and/or Harvard architecture as a non-limiting example. Processor 1104 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 1108 may include various components (e.g., machine-readable media) including, but not limited to, a random-access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1124 (or one or more components thereof) may be removably interfaced with computer system 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computer system 1100. In one example, software 1120 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 1100 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIREWIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computer system 1100 via network interface device 1140.

Computer system 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating a report, the apparatus comprises:

at least a processor; and a memory communicatively connected to the at least a processor, wherein the memory contains instructions configuring the at least a processor to:

receive a plurality of structured data comprising at least an event from a structured data source;

determine an activity classification as a function of the plurality of structured data, wherein the activity classification comprises an activity identifier;

generate a structured data report as a function of the activity identifier, wherein generating the structured data report is a function of a confidence score of the structured data, wherein generating the structured data report comprises comparing the confidence score to a confidence threshold, wherein the confidence score is determined as a function of comparing first structured data from a first structured data report to second structured data from a second structured data report; and generate a final report using a large language model (LLM), wherein the LLM is configured to receive as input the structured data report and output the final report, wherein generating the final report comprises generating a report link, wherein generating the report link comprises:

identifying a previous report as a function of a report tag;

generating the report link as a function of the previous report; and inserting the report link into the final report.

2. The apparatus of claim 1, wherein the confidence score comprises a user-defined confidence score.

3. The apparatus of claim 1, wherein the structured data is conditionally included in the structured data report when the confidence score exceeds the confidence threshold.

4. The apparatus of claim 1, wherein the at least a processor is configured to determine an activity classification based on the plurality of structured data, wherein determining the activity classification comprises applying a plurality of activity conditions to the structured data, wherein the activity classification includes an activity identifier that identifies key facts related to the activity.

5. The apparatus of claim 1, wherein identifying the previous report as a function of the report tag comprises locating a unique identifier associated with the previous report in a lookup table using the report tag.

6. The apparatus of claim 1, wherein the processor is configured to:

receive the unique identifier associated with the final report;

store the unique identifier and corresponding report tags in a data structure;

retrieve the unique identifier based on the corresponding report tags; and generate a link to the report using the unique identifier.

7. The apparatus of claim 1, wherein the structured data comprises event data.

8. The apparatus of claim 1, wherein receiving the plurality of structured data from the structured data source comprises performing optical character recognition on the plurality of structured data to convert the plurality of structured data to machine-encoded text.

9. A method for generating a final report, wherein the method comprises:

receiving, using at least a processor, a plurality of structured data comprising at least an event from a structured data source;

determining, using the at least a processor, an activity classification as a function of the plurality of structured data, wherein the activity classification comprises an activity identifier;

generating, using the at least a processor, a structured data report as a function of the activity identifier, wherein generating the structured data report is a function of a confidence score of the structured data, wherein generating the structured data report comprises comparing the confidence score to a confidence threshold, wherein the confidence score is determined as a function of comparing first structured data from a first structured data report to second structured data from a second structured data report; and generating, using the at least a processor, a final report using a large language model (LLM), wherein the LLM is configured to receive as input the structured data report and output the final report, wherein generating the final report comprises generating a report link, wherein generating the report link comprises:

identifying a previous report as a function of a report tag;

generating the report link as a function of the previous report; and inserting the report link into the final report.

10. The method of claim 9, wherein the confidence score comprises a user-defined confidence score.

11. The method of claim 9, wherein the structured data is conditionally included in the structured data report when the confidence score exceeds the confidence threshold.

12. The method of claim 9, further configured to determine an activity classification based on the plurality of structured data, wherein determining the activity classification comprises applying a plurality of activity conditions to the structured data, wherein the activity classification includes an activity identifier that identifies key facts related to the activity.

13. The method of claim 9, wherein identifying the previous report as a function of the report tag comprises locating a unique identifier associated with the previous report in a lookup table using the report tag.

14. The method of claim 9, further configured to:

receive the unique identifier associated with the final report;

store the unique identifier and corresponding report tags in a data structure;

retrieve the unique identifier based on the corresponding report tags; and generate a link to the report using the unique identifier.

15. The method of claim 9, wherein the structured data comprises event data.

16. The method of claim 9, wherein receiving the plurality of structured data from the structured data source comprises performing optical character recognition on the plurality of structured data to convert the plurality of structured data to machine-encoded text.

* * * * *